US012168622B2

United States Patent
Tang et al.

(10) Patent No.: US 12,168,622 B2
(45) Date of Patent: Dec. 17, 2024

(54) METHODS AND SYSTEMS FOR REMOVING TRICHLOROETHANE, TRICHLOROETHENE, AND 1,4-DIOXANE FROM CONTAMINATED WATER AND WASTEWATER

(71) Applicants: Arizona Board of Regents on Behalf of Arizona State University, Scottsdale, AZ (US); Florida State University Research Foundation, Inc., Tallahassee, FL (US)

(72) Inventors: Youneng Tang, Tallahasee, FL (US); Bruce Rittmann, Tempe, AZ (US); Chen Zhou, Chandler, AZ (US); Yihao Luo, Phoenix, AZ (US); Rosa Krajmalnik-Brown, Chandler, AZ (US)

(73) Assignees: Arizona Board of Regents on Behalf of Arizona State University, Scottsdale, AZ (US); Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 18/002,450

(22) PCT Filed: Jun. 17, 2021

(86) PCT No.: PCT/US2021/037922
§ 371 (c)(1),
(2) Date: Dec. 19, 2022

(87) PCT Pub. No.: WO2021/257896
PCT Pub. Date: Dec. 23, 2021

(65) Prior Publication Data
US 2023/0264991 A1 Aug. 24, 2023

Related U.S. Application Data

(60) Provisional application No. 63/040,512, filed on Jun. 17, 2020.

(51) Int. Cl.
*C02F 1/70* (2023.01)
*B01J 23/44* (2006.01)
(Continued)

(52) U.S. Cl.
CPC ............... *C02F 1/705* (2013.01); *B01J 23/44* (2013.01); *B01J 35/00* (2013.01); *B01J 35/23* (2024.01);
(Continued)

(58) Field of Classification Search
CPC .. C02F 1/705; C02F 3/102; C02F 3/34; C02F 2101/34; C02F 2101/36; C02F 2305/08;
(Continued)

(56) References Cited

U.S. PATENT DOCUMENTS

| 4,662,938 A | 5/1987 | Whitney |
| 6,387,262 B1 | 5/2002 | Rittmann |

(Continued)

FOREIGN PATENT DOCUMENTS

| KR | 101984164 B1 * | 5/2019 | ............... B09C 1/08 |
| WO | 2006087334 A1 | 8/2006 | |

(Continued)

OTHER PUBLICATIONS

Bruce Rittmann et al, "Final Report, Synergistic Reductive Dechlorination of 1,1,1-Trichloroethane and Trichloroethene and Aerobic Biodegradation of 1,4-Dioxane", Phase I, SERDP Project ER-2721, published Feb. 2019. (Year: 2019).*

(Continued)

*Primary Examiner* — Joseph W Drodge
(74) *Attorney, Agent, or Firm* — BOOTH UDALL FULLER, PLC (57) ABSTRACT

Disclosed herein are systems and methods for removing trichloroethane (TCA), trichloroethene (TCE), and 1,4-dioxane (1,4-D) from contaminated liquids. The system and (Continued)

methods rely on catalyst reduction of TCA and TCE, where the reduced products are then degraded by microorganisms The system comprises a first reactor comprising a catalyst film of precious metal nanoparticles deposited on a first nonporous membrane and a second reactor comprising a biofilm of microorganisms that are capable of degrading ethane and 1,4-D deposited on a second nonporous membrane. The first reactor further comprises a hydrogen gas source, wherein the hydrogen gas source delivers hydrogen to the gas-phase side of the first nonporous membrane, and the catalyst film is deposited on the liquid-phase side. The second reactor further comprises an oxygen gas source, wherein the oxygen gas source delivers oxygen to the gas-phase side of the second non-porous membrane, and the biofilm is deposited on the liquid-phase side.

18 Claims, 6 Drawing Sheets

(51) Int. Cl.
| | | |
|---|---|---|
| *B01J 35/00* | (2024.01) | |
| *B01J 35/23* | (2024.01) | |
| *B01J 35/30* | (2024.01) | |
| *B01J 35/39* | (2024.01) | |
| *C02F 3/10* | (2023.01) | |
| *C02F 3/34* | (2023.01) | |
| *C02F 101/34* | (2006.01) | |
| *C02F 101/36* | (2006.01) | |

(52) U.S. Cl.
CPC ............. *B01J 35/30* (2024.01); *B01J 35/393* (2024.01); *C02F 3/102* (2013.01); *C02F 3/34* (2013.01); *C02F 2101/34* (2013.01); *C02F 2101/36* (2013.01); *C02F 2305/08* (2013.01)

(58) Field of Classification Search
CPC .... C02F 1/70; C02F 3/341; C02F 1/26; C02F 1/58; C02F 3/107; C02F 2101/366; B01J 23/44; B01J 35/00; B01J 35/23; B01J 35/30; B01J 35/393; B01J 19/245; B01J 19/2475; B01J 35/43; B01J 2219/2423; B01J 2219/2429; B01J 2219/2475; B01J 2219/248; Y02W 10/10
See application file for complete search history.

(56) References Cited

U.S. PATENT DOCUMENTS

| | | | |
|---|---|---|---|
| 7,279,103 | B2 | 10/2007 | Burckle |
| 8,318,017 | B2 | 11/2012 | Fane |
| 8,591,915 | B2 | 11/2013 | Buetow |
| 8,696,913 | B2 | 4/2014 | Casey |
| 9,233,863 | B2 | 1/2016 | Cable |
| 9,890,052 | B2 | 2/2018 | Banerjee |
| 9,902,634 | B2 | 2/2018 | Friese |
| 10,273,174 | B2 | 4/2019 | Syron |
| 2007/0090057 | A1 | 4/2007 | Burckle |
| 2008/0302720 | A1 | 12/2008 | Bowman |
| 2010/0230359 | A1 | 9/2010 | Whitehead |
| 2012/0074071 | A1 | 3/2012 | Hassler |
| 2014/0235428 | A1* | 8/2014 | Pan ........................ B01J 37/16 502/159 |
| 2017/0015968 | A1* | 1/2017 | Parameswaran ....... B01D 61/18 |
| 2020/0157523 | A1 | 5/2020 | Semprini |
| 2020/0339453 | A1* | 10/2020 | Siegert ................... C02F 1/461 |
| 2021/0179463 | A1 | 6/2021 | Zhou |

FOREIGN PATENT DOCUMENTS

| | | | | |
|---|---|---|---|---|
| WO | WO-2013188844 | A2 * | 12/2013 | .............. C02F 3/105 |
| WO | WO-2017136528 | A1 * | 8/2017 | ............ C02F 3/2806 |

OTHER PUBLICATIONS

English Translation of Patent Publication KR 101984164, published May 30, 2019. (Year: 2019).*
Milavec et al publication: "1,4-Dioxane cosolvency impacts on trichloroethene dissolution and sorption", published by Environmental Pollution, vol. 252, (2019), pp. 777-783. (Year: 2019).*
Tusher et al publication: "Enrichment and Analysis of Stable 1,4-dioxane-Degrading Microbial Consortia Consisting of Novel Dioxane-Degraders", published by Tohoku University, Japan, Dec. 25, 2019. (Year: 2019).*
Johnson, P. Dawson, B. V; Goldberg, S. J. "A Review: Trichloroethylene Metabolites: Potential Cardiac Teratogens." Environ. Health Perspect. 1998, 106 (suppl 4), 995-999.
Just C.L., J.L. Schnoor, (2004) "Phytophotolysis of hexahydro-1, 3, 5-trinitro-1, 3, 5-triazine (RDX) in leaves of reed canarygrass," Environ Sci Technol, 38, 290-295.
Karanasios K., I. Vasiliadou, S. Pavlou, D. Vayenas, (2010) "Hydrogenotrophic denitrification of potable water:a review," J HazardMater, 180, 20-37.
Karges, U; Becker, Püttmann, W. "1,4-Dioxane Pollution at Contaminated Groundwater Sites in Western Germany and Its Distribution within a TCE Plume." Sci. Total Environ. 2018, 619-620, 712-720. https://doi.org/l().1016/j.scitotenv.2017.1 1043.
Kim, Y. Jeon, Muruge:san, Kim, E,-J, and Chang, Y.-S. (2009) "Biodegradation of I , 4-dioxane and transformation of related cyclic compounds by a newly isolated *Mycobacterium* sp PH-06." Biodegradation 20(4), 511.
Kirszensztejn P., L. Wachowski, A. Szymkowiak, P. Marciniak, B. Czajka, W. Skupinski, (2003) "Catalytic Conversion CCI [sub3] F and CCI [sub2] F [sub2] over Metal SupportedCatalysts," Polish Journal of Environmental Studies, 12.
Klaewkla R. , M. Arend, W.F. Hoelderich, (2011) "A review of mass transfer controlling the reaction rate in heterogeneous catalytic systems," INTECH Open Access Publisher Rijeka.
Kotsyurbenko, O R.. M. V. Glagolev, A. N. Nozhevnikova and R. Conrad (2001). "Competition between homoacetogenic bacteria and methanogenic archaea for hydrogen at low temperature," 153-159.
Lakshminarayana B., K.A. Kumar, M. Selvaraj, G. Satyanarayana, S. (2020) "Ch, PVP-PS supported ultra-small Pd nanoparticles for the room temperature reduction of 4-nitrophenol," Journalof Environmental ChemicalEngineering, 103899.
Leaist, D.G and P A. Lyons (1981). "Multicomponent diffusion of electrolytes With incomplete dissociation diffusion in a buffer solution." The Journal of Physical Chemistry 85(12), 1756-1762.
Lee S.-J., H.-S. Son, H.-K. Lee, K.-D. Zoh, (2002) "Photocatalytic degradation of explosives contaminatedwater," Water SciTechnol,46 (2002) 139-145.
Leiknes, T., & Ødegaard, H. (2007). "The development of a biofilm membrane bioreactor." Desalination, 202(1-3), 135-143.
Lien, H.L.; Zhang, W. X. "Nanoscale Pd/Fe Bimetallic Particles: Catalytic Effects of Palladium on Hydrodechlorination." Appl. Catal. B Environ. 2007, 77 (1-2), 110-116. https://doi.org/10.10160.apcatb.2007.07.014.
Liu Z., Y. He, F. Li, Y. Liu, (2006) "Photocatalytic treatment of RDX wastewaterwith nano-sized titanium dioxide (5 pp)," Environmental Science and Pollution Research 13, 328-332.
Liu, Z , Zhou, C, Ontiveros-Valencia, A. Luo, Y.H., Long, NL, Xu, H. and Rittmann, WE. (2018) "Accurate 02 delively enabled benzene biodegradation through aerobic activation followed by denitrification-coupled mineralization." Biotechnology and Bioengineering.
Lowry, G. V and Reinhard, M. (1999) "Hydrodehalogenation of I-to 3 Carbon halogenated organic compounds in water using a palladium catalyst and hydrogen gas" Environmental Science & Technology 33(11), 1905-1910.

(56) References Cited

OTHER PUBLICATIONS

Lowry, G. V. and Reinhard, M. (2001) "Pd-catalyzed TCE dechlorination in water: effect of and H2-utilizing competitive solutes on the TCE dechlorination rate and product distribution." Environmental science & technology 35(4), 696-702.

Maharajh, D. M and J. Walkley (1972). "Lowering of the saturation solubility of oxygen by the presence of another gas." Nature 236(5343): 165.

Mahendra, S., Petzold, C.J., Baidoo, E.E., Keasling. J.D. and Alvarez-Cohen, L. (2007) "Identification of the intermediates of in vivo oxidation of 1,4-dioxane by monooxygenase-containing bacteria," Environmental Science & Technology 41(21), 7330-7336.

Mahendra, S.; Grostern, A.; Alvarez-Cohen, L. "The Impact of Chlorinated Solvent co-Contaminants on the Biodegradation Kinetics of 1,4-Dioxane." Chemosphere 2013, 91 (I), 88-92. https://doi.org/10.1016/j.chemosphere.2012.10.104.

Matteucci, F, , C, Ercole and M, del Gallo (2015), "A study of chlorinated solvent contamination of the aquifers of an industrial area in central Italy: a possibility of bioremediation Front." Microbiol. 6, 924.

Maymó-Gatell, X. , Y-C Chien, J, M, Gossett and S. H, Zinder (1997), "Isolation of a bacterium that reductively dechlorinates tetrachloroethene to ethene." Science 276(5318): 1568-1571.

Maymó-Gatell, X., V. Tandoi, J.M. Gossett and S.H. Zinder (1995). "Characterization of an H2 utilizing enrichment culture that reductively dechlorinates tetrachloroethene to vinyl chloride and ethene in the absence of methanogenesis and acetogenesis," Appl. Environ. Microbiol. 61(11); 3928-3933.

Moon B.-H., Y.-B. Park, K.-H. Park, (2011) "Fenton oxidation of Orange II by pre-reduction using nanoscalezero-valent iron," Desalination,268, 249-252.

Moran, M.L, Zogorski, JS and Squillace, P.L (2007) "Chlorinated solvents in groundwater ofthe United States." Environmental science & technology 41(1), 74-81.

Mori, V , Kubo, and Morikawa, Y (2004) "Hydrodechlorination of I, I, I-trichloroethane over silica-supported palladium catalyst." Applied Catalysis A: General 271(1-2), 69-76.

Mundle, S.O, T. Johnson, G Lacrampe-Couloume, A Perez-de-Mora, M. Duhamel, E. A. Edwards, M. L McMaster, E. Cox, K Révész and B. Sherwood Lollar (2012) "Monitoring biodegradation of ethene and bioremediaticm of chlorinated ethenes at a contaminated site using compound-specific isotope analysis (CSIA)." Environmental science & technology 46(3); 1731-1738.

Ni, BJ., Liu, H., Nie, YQ., Zeng, RJ., Du, Chen, and Yu, HQ. (2011) "Coupling glucose fermentation and homoacetogenesis for elevated acetate production: experimental and mathematical approaches." Biotechnology and bioengineering 108(2), 345-353.

Nutt, Hughes, J and MS. (2005) "Designing Pd-on-Au bimetallic nanoparticle catalysts for trichloroethene hydrodechlorination." Environmental science & technology 39(5), 1346-1353.

Oh S.-Y. , P.C. Chiu, B.J. Kim, D.K. Cha, (2005) "Zero-valent iron pretreatment for enhancing the biodegradabilityof RDX," WaterRes, 39, 5027-5032.

Omole M.A., I.O. K'Owino, O.A. Sadik, (2007) "Palladium nanoparticles for catalytic reduction of Cr (VI) using formic acid," Applied Catalysis B: Environmental, 76, 158-167.

Ordóñez S., M. Makkee, J. Moulijn, (2001) "Performance of activated carbon-supported noble metal catalysts in the hydrogenolysis of CCl3F," Applied Catalysis B: Environmental, 29, 13-22.

Parales, Adamus, White, N, and May, H. (1994) "Degradation of I, 4-dioxane by an actinomycete in pure culture." Applied and Environmental Microbiology 60(12), 45274530.

Picioreanu, C, M C. Van Loosdrecht and L J. Heijnen (2000). "Effect of diffusive and convective substrate transport on biofilm structure formation: a two-dimensional modeling study" Biotechnology and bioengineering 69(5): 504-515.

Pouretedal H.R. , M.H. Keshavarz, M.H. Yousefi, E.A. Shokr, A. Zali, (2009) "Photodegradation of HMX and RDX in the presence of nanocatalyst of zinc sulfide dopedwith copper,".

Qian A., P. Liao, S. Yuan, M. Luo, (2014) "Efficient reduction of Cr (VI) in groundwater by a hybridelectro-Pd process," Water Res, 48, 326-334.

Qian H. , Z. Zhao, J.C. Velazquez, L.A. Pretzer, K.N. Heck, M.S. Wong, (2014) "Supporting palladium metal on gold nanoparticles improves its catalysis for nitrite reduction," Nanoscale, 6, 358-364.

Rittmann B., Et Al., "Synergistic Reductive Dechlorination of 1,1,1-Trichloroethane and Trichloroethene and Aerobic Biodegradation of 1,4-Dioxane", SERDP, (Feb. 1, 2019), pp. 1-116, XP055888219.

Scheutz, C.; Durant, N. Hansen, M. H.; Bjerg, P. L. "Natural and Enhanced Anaerobic Degradation of 1, 1,1-Trichloroethane and Its Degradation Products in the Subsurface—A Critical Review." Water Research, 2011, 45 (9), 2701-2723. https.'//doi.org/10.1016/j.watres.2011.02.027.

Schreier, C G; Reinhard, M. "Catalytic Hydrodehalogenation of Chlorinated Ethylenes Using Palladium and Hydrogen for the Treatment of Contaminated Water." Chemosphere 1995, 31 (6), 3475-3487. https://doi.org/10.1016/0045-6535 (95)00200- R.

Shuai D., B.P. Chaplin, J.R. Shapley, N.P. Menendez, D.C. McCalman, W.F. Schneider, C.J. Werth, (2010) "Enhancement of oxyanion and diatrizoate reduction kinetics using selected azo dyes on Pd-based catalysts," Environ Sci Technol, 44, 1773-1779.

Śrębowata A., W. Lisowski, J.W. Sobczak, Z. Karpiński, (2015) "Hydrogen-assisted dechlorination of 1,2-dichloroethane on active carbon supported palladium-copper catalysts," CatalToday, 175, 576-584.

Stewart, P S. (1993). "A model of biofilm detachment." Biotechnology and bioengineering 41(1): 111-117.

Stickney, J. A.; Sager, S. L. , Clarkson, J. R_; Smith, L. A.; Locey, B. J.; Bock, M. J; Hartung, R. , Olp, S. F. "An Updated Evaluation of the Carcinogenic Potential of 1,4-Dioxane." Regul. Toxicol. Pharmacol. 2003, 38 (2), 183-195

Sung, Y, K.E. Fletcher, K.M. Ritalahti, R.P Apkarian, N. Ramos-Hernåndez, R.A. Sanford, N.M. Mesbah and F.E. Löffler (2006), "Geobacter lovleyi sp. nov strain SZ, a novel metal-reducing and tetrachloroethene-dechlorinating bacterium." Appl, Environ. Microbiol. 72(4): 2775-2782.

Tajima M., M. Niwa, Y. Fujii, Y. Koinuma, R. Aizawa, S. Kushiyama, S. Kobayashi, K. Mizuno, H. Ohuchi, (1996) Decomposition of chlorofluorocarbons in the presence of water over zeolitecatalyst, AppliedCatalysisB: Environmental, 9, 167-177.

Tang, Y, H. Zhao, A. K. Marcus, R. Krajmalnik-Brown and B. Rittmann, (2012) "A steady-state biofilm model for simultaneous reduction of nitrate and perchlorate, part I model development and numerical solution." Environmental Science & Technology 46(3): 1598-1607.

Tang, Y, R. Krajmalnik-Brown and B. E. Rittmann (2013). "Modeling trichloroethene reduction in a hydrogen-based biofilm." Water Science and Technology 68(5): 1158-1163.

U.S. Environmental Protection Agency, National primary Drinking Water Regulations. 2009.

USEPA. Contaminant Information Sheets (CISs)for the Final Fourth Contaminant Candidate List (CCL 4); 2018.

Vainberg, S., Condee, C.W and StetYan, R.J. (2009) "Large-scale production of bacterial consortia for remediation of chlorinated solvent-contaminated groundwater." Journal of Industrial Microbiology & Biotechnology 36(9), 1189-1197.

Vainberg, S.; McClay, K.; Masuda, H.; Root, D.; Condee, C.; Zylstra, G.; Steffan, R.J. (2006) "Biodegradation of Ether Pollutants by *Pseudonocardia* Sp. Strain ENV478." Applied and Environmental Microbiology 72(8), 5218-5224.

Varfolomeyev, S. Kalyuzhnyy, S and Spivak, S. (1989) "Kinetic regularities of methane production by a methanogenic association," Applied biochemistry' and biotechnology 2213, 351-360.

Vavilin, V, Lokshina, LN., Rytov, S. , Kotsyurbenko, O, Nozhevnikova, A and Parshina, S. (1997) "Modelling methanogenesis during anaerobic conversion of complex organic matter at low temperatures." Water Science and Technology 36(6-7), 531-538.

Wang K. , S. Shu, M. Chen, J. Li, K. Zhou, J. Pan, X. Wang, X. Li, J. Sheng, F. Dong, (2020) "Pd-TiO2 Schottky heterojunction catalyst boost the electrocatalytic hydrode chlorination reaction," ChemicalEngineeringJournal,381, 122673.

(56) References Cited

OTHER PUBLICATIONS

Yang Q., F. Yao, Y. Zhong, D. Wang, F. Chen, J. Sun, S. Hua, S. Li,X. Li, G. Zeng, (2016) "Catalytic and electrocatalytic reduction of perchlorate in water-a review," Chemical EngineeringJournal, 306, 1081-1091.

Yang Q., F. Yao, Y. Zhong, F. Chen, X. Shu, J. Sun, L. He, B. Wu, K. Hou, D. Wang, (2019) "Metal-Organic Framework Supported Palladium Nanoparticles: Applications and Mechanisms," Particle& ParticleSystems Characterization, 36, 1800557.

Yang, L., Qiu, H., Lu, Z., Zhang, C., Liu, G., Chang, J., . . . & Xiao, F. (2023). "Effect of Membrane Fouling with Different Backwash Mode for Ultrafiltration" Process in Municipal Wastewater: Hydraulic Backwash and Backwash with Sodium Hypochlorite.

Yu, S; Dolan, M. E.; Semprini, L. "Kinetics and Inhibition of Reductive Dechlorination of Chlorinated Ethylenes by Two Different Mixed Cultures." Environmental science & technology 39(1), 195-205.

Yu, S. and L. Semprini (2004). "Kinetics and modeling of reductive dechlorination at high PCE and TCE concentrations." Biotechnology and bioengineering 88(4), 451-464.

Zeebe, R.E. (2011) "On the molecular diffusion coefficients of dissolved C02, HC03-, and C032- and their dependence on isotopic mass." Geochimica et CosmochimicaActa 75(9), 2483-2498.

Zenker, M.j, Borden, R.C. and Barlaz M.A. (2003) "Occurrence and treatment of 1,4-dioxane in aqueous environments." Environmental Engineering Science 20(5), 423-432.

Zhang, S.; Gedalanga, P. B.; Mahendra, S. (2016) "Biodegradation Kinetics of 1,4-Dioxane in Chlorinated Solvent Mixtures." Environmental science & technology, 50 (17), 9599-9607.

Zhang, X., Guo, J., Wang, L., Hu, J., & Zhu, J. (2013). "In situ ozonation to control ceramic membrane fouling in drinking water treatment." Desalination, 328, 1-7.

Zheng et al., (2018) "Membrane fouling mechanism of biofilm-membrane bioreactor (BF-MBR): Pore blocking model and membrane cleaning" Bioresouce Technology, https://doi.org/10.1016/j.biortech.2017.11.036.

Zhou C., A. Ontiveros-Valencia, R. Nerenberg, Y. Tang, D. Friese, R. Krajmalnik-Brown, B. Rittmann, (2019) "Hydrogenotrophic Microbial Reduction of Oxyanions with the Membrane Biofilm Reactor," FrontMicrobiol, 9 1-14.

Zhou, C, Wang, Z, Marcus, A.K. and Rittmann, B.E (2016) "Biofilm-enhanced continuous synthesis and stabilization of palladium nanoparticles PdNPsb" Environmental Science: Nano 3(6).

Zhou, Y, Huang, H. and Shen, D (2016) "Multi-substrate biodegradation interaction of I, 4-dioxane and BTEX mixtures by Acinetobacter baumannii DDI." Biodegradation 27(1), 37-46.

Ziv-El, M., Popat, S.C., Parameswaran, P., Kang, Dav., Polasko, X, Halden, R.U., Rittmann, BE. and Krajmalnik-Brown, R. (2012) "Using electron balances and molecular techniques to assess trichoroethene-induced shifts to a dechlorinating microbial community." Biotechnology and Bioengineering 109(9), 2230-2239.

Ziv-El, M.; Popat, S. C.; Cai, K.; Halden, R. U.; Krajmalnik-Brown, R.; Rittmann, B. E. "Managing Methanogens and Homoacetogens to Promote Reductive Dechlorination of Trichloroethene with Direct Delivery of H2 in a Membrane Biofilm Reactor." Biotechnol. Bioeng. 2012, 109 (9), 2200-2210. https://doi.org/10.1002/bit_24487.

Ziv-El, NL, Delgado, A.G., Yao, Y, Kang, D.w., Nelson, Halden, R,U. and Krajmalnik-Brown, R. (2011) "Development and characterization of DehaloRA2, a novel anaerobic microbial consortium performing rapid dechlorination of TCE to ethene" Applied Microbiology and Biotechnology 92(5), 1063-1071.

Adamson, D. T.; Anderson, R. Mahendra, S.; Newell, C. J. "Evidence of 1,4-Dioxane Attenuation at Groundwater Sites Contaminated with Chlorinated Solvents and 1,4-Dioxane." Environ. Sci. Technol. 2015, 49 (II), 6510-6518. https://doi.org/l().1021/acs.est.5b00964.

Adamson, D. T.; McDade, J. M.; Hughes, J. B. "Inoculation ofa DNAPL Source Zone to Initiate Reductive Dechlorination of PCE." Environ. Sci. Technol. 2003, 37 (11), 2525-2533. https://doi.org/10.1021/es020236y.

Adamson, D.T., Mahendra, S., Walker Jr, KL., Rauch, SR. Sengupta, S. and Newell, (2014) "A multisite survey to identify the scale of the I, 4-dioxane problem at contaminated groundwater sites." Environmental Science & Technology Letters I(S), 254-258.

Anderson, R.H., Anderson, J.K. and Bower, P.A. (2012) "Co-occurrence of I, 4-dioxane with trichloroethylene in chlorinated solvent groundwater plumes at US Air Force installations; Fact or fiction?" Integrated environmental assessment and management 8(4), 731-737.

Aulenta, F. L M. Gossett, M. P Papini, S Rossetti and M. Majone (2005) "Comparative study Of methanol, butyrate, and hydrogen as electron donors for long term dechlorination of tetrachloroethene in mixed anerobic cultures" Biotechnol. Bioeng 91 (6): 743-753.

Bakke, B.; Stewart, P.A.; Waters, M.A. "Uses of and Exposure to Trichloroethylenein US Industry: A Systematic Literature Review." J. Occup. Environ. Hyg 2007, 4 (5), 375-390.

Bernhardt, D and Diekmann, VI (1991) "Degradation of dioxane, tetrahydrofuran and other cyclic ethers by an environmental Rhodococcus strain." Applied microbiology and biotechnology 36(1), 120-123.

Burback, B.L and Perry, J.J. (1993) "Biodegradation and biotransformation of groundwater pollutant mixtures by *Mycobacterium vaccae*." Applied and Environmental Microbiology 59(4), 1025-1029.

Chambon, J.C, P.L Bjerg, C. Scheutz, J. Bælum, R. Jakobsen and P J. Binning (2013). "Review of reactive kinetic models describing reductive dechlorination of chlorinated ethenes in soil and groundwater" Biotechnol. Bioeng. 110(1):1-23.

Chambon. L, Lemming, G, Broholm, NL, Binning PA. and Bjerg, P.L (2009) "Model assessment of reductive dechlorination as a remediation technology for contaminant sources in fractured clay: Modeling Tool Delrepport II." Danish Environmental Protection Agency.

Chan, W. W. M.; Grostern, A.; Loffler, F. E.; Edwards, E. A. "Quantifying the Effects of Trichloroethane and I,I-Dichloroethane on Chlorinated Ethene Reductive Dehalogenases." Environ. Sci. Technol. 2011, 45 (22), 9693-9702. https://doi.org/10.1021/es201260n.

Chaplin, B,P., Reinhard, M., Schneider, W.F., Schiith, C., Shapley, J.R,, Strathmann, T.J, and Werth, C J. (2012) "Critical review of Pd-based catalytic treatment of priority contaminants in water." Environmental Science & Technology 46(7), 3655-3670.

Chen X., X. Huo, J. Liu, Y. Wang, C.J. Werth, T.J. Strathmann, (2017) "Exploring beyond palladium: Catalytic reduction of aqueous oxyanion pollutants with alternative platinum group metalsand new mechanistic implications," ChemicalEngineering Journal, 313, 745-752.

Chen, D.Z., Jin, X,-J., Chen, Ye, J.-X. Jiang N.X and Chen, J.M, (2016) "Intermediates and substrate interaction of 1,4-dioxane degradation by the effective metabolizer Xanthobacterfiavus International Biodeterioration & Biodegradation" 106, 133-140.

Choe J.K., M.I. Boyanov, J. Liu, K.M. Kemner, C.J. Werth, T.J. Strathmann, (2014) "X-ray spectroscopic characterization of immobilized rhenium species in hydrated rhenium-palladium bimetallic catalysts used for perchlorate water treatment," The Journal of PhysicalChemistryC, 118, 11666-11676.

Christ, J A, and Abnolm L.M. (2007) "Modeling metabolic reductive dechlorination in dense non-aqueous phase liquid source-zones Advances in water resources" 30(6-7), 1547-1561.

Chung, J., R. Krajmalnik-Brown and B. Rittmann. E (2007). "Bioreduction of trichloroethene using a hydrogen-based membrane biofilm reactor" Environmental science & technology 42(2):477-483.

Chung, J. and B. E Rittmann (2008) "Simultaneous bio-reduction of trichloroethene, trichloroethane, and chloroform using a hydrogen-based membrane biofilm reactor"Water Science and Technology 58(3): 495-501.

(56) References Cited

OTHER PUBLICATIONS

Chung, J. and Rittmann, B.E. (2007) "Bio-reductive dechlorination of 1,1,1-trichloroethane and chloroform using a hydrogen-based membrane biofilm reactor." Biotechnology and Bioengineering 97(1), 52-60.
Clapp, L.W., Semmens, M.J., Novak, and Hozalski, RAL (2004) "Model for in situ perchloroethene dechlorination via membrane-delivered hydrogen." Journal of Environmental Engineering 130(11), 1367-1381.
Crawford, L, Jones, DG_, Llados, F. , Risher, L and Tencza, B (2012) "Toxicological profile for 1,4-dioxane."
Cupples, A.M., Spormann, A.M. and McCarty. PL. (2004) "Vinyl chloride and cis-dichloroethene dechlorination kinetics and microorganism growth under substrate limiting conditions." Environmental science & technology 38(4), 1102-1107.
Davie, M.G., Cheng, HD, Hopkins, G,D., LeBron, C.A. and Reinhard, M. (2008) "Implementing heterogeneous catalytic dechlorination technology for remediating TCE-contaminated groundwater." Environmental science & technology 42(23), 8908-8915.
Delannoy L., J.-M. Giraudon, P. Granger, L. Leclercq, G. Leclercq, (2000) "Group VI transition metal carbides as alternatives in the hydrodechlorination of chlorofluorocarbons," Catal Today, 59, 231-240.
Delgado, A. G., P Parameswaran, D., Fajardo-Williams, R. U. Halden and R. Krajmalnik-Brown (2012). "Role of bicarbonate as a pH buffer and electron sink in microbial dechlorination of chloroethenes." Microb. Cell Fact. 11(1) 128.
Delgado, A.G., Fajardo-Williams, D, Popat, S.C., Torres, C.I. and Krajmalnik-Brown, R. (2014) "Successful operation of continuous reactors at short retention times results in high-density, fast-rate Dehalococcoides de-chlorinating cultures." Applied Microbiology and Biotechnology 98(6), 2729-2737.
Delgado, A.G., Kang. Nelson. K.G., Fajardo-Williams, D., Miceli III. Jif Done, H. Popat, S.C and Krajmalnik-Brown, R (2014) "Selective enrichment yields robust ethene-producing dechlorinating cultures from microcosms stalled at cis-dichloroethene" Plos one 9(6), e100654.
Deng, D.; Li, F.; Li, M. "A Novel Propane Monooxygenase Initiating Degradation of 1,4-Dioxane by *Mycobacterium dioxanotrophicus* PH-06." Environ. Sci. Technol. Lett. 2018, 5 (2), 86-91. https://doi.org/10.1021/acs.estlett.7b00504.
Dong Z., X. Le, Y. Liu, C. Dong, J. Ma, (2014) "Metal organic framework derived magnetic porous carbon composite supported gold and palladium nanoparticles as highly efficient and recyclable catalysts for reduction of 4-nitrophenol and hydrodechlorination of 4-chlorophenol," Journal of Materials Chemistry A, 2 18775-18785.
Dugat-Bony, E., Biderre-Petit, C., Jaziri, F u, David, MM., Denonfoux, J., Lyon, D.Y., Richard, JVY., Curvers, C, Boucher. D. and Vogel, Tim. (2012) "In situ TCE degradation mediated by complex dehalorespiring communities during biostimulation processes." Microbial biotechnology 5(5), 642-653.
Dumas,O.;Despreaux,T.;Perros,F.;Lau,E.;Andujar,P.;Humbert,M.; Montani,D.; Descatha, A. "Respiratory Effects of Trichloroethylene." Respir. Med. 2018, 134, 47-53.
EPA "2012 Edition of the Drinking Water Standards and Health Advisories." United States 2012.
Fennell, D. E. and J. M. Gossett (1998). "Modeling the production of and competition for hydrogen in a de-chlorinating culture," Envimn. Sci. Technol. 32(16); 2450-2460.
Freeberg, K., Bedient, P and Connor, J. (1987) "Modeling of TCE contamination and recovery in a shallow sand aquifer" Groundwater 25(1), 70-80.

Gong J. , C.-S. Lee, Y.-Y. Chang, Y.-S. Chang, (2015) "Novel self-assembled bimetallic structure of Bi/Fe 0: the oxidative and reductive degradation of hexahydro-1, 3, trinitro-1,3, 5-triazine (RDX)," J HazardMater,286, 107-117.
Grostern, A.; Chan, W.W.M.; Edwards, E.A. "1,1, I-Trichloroethane and 1,1-Dichloroethane Reductive Dechlorination Kinetics and Co-Contaminant Effects in a Dehalobacter-Containing Mixed Culture." Environ. Sci. Technol. 43 (17), 6799-6807. 2009, https://doi.org/10.1021/es901038x.
Guo et al., (2013) "Membrane fouling of hybrid submerged membrane bioreactor (hMBR) in treating municipal wastewater" Balaban Desaliniation Publications, doi: 10.1080/19443994.2013.831778.
Guo S. , K. Heck, S. Kasiraju, H. Qian, Z. Zhao, L.C. Grabow, J.T. Miller, M.S. Wong, (2017) "Insights into nitrate reduction over indium-decorated palladium nanoparticle catalysts," ACS Catalysis, 8, 503-515.
Guy K.A., H. Xu, J.C. Yang, C.J. Werth, J.R. Shapley, (2009) "Catalytic nitrate and nitrite reduction with Pd-Cu/PVP colloids in water: Composition, structure, and reactivity correlations," The Journal of Physical Chemistry C, 113, 8177-8185.
Haston, Z.C. and McCarty, P.L. (1999) "Chlorinated ethene half-velocity coefficients for reductive dehalogenation." Environmental Science & Technology 33(2), 223-226.
He, J., Holmes, V.F., Lee, P,K, and Alvarez-Cohen, L, (2007) "Influence of vitamin B12 and co-cultures on the growth of Dehalococcoides isolates in defined medium." Applied and Environmental Microbiology 73(9), 2847-2853.
He, J., K. M. Ritalahti, KL-L Yang, S.S. Koenigsberg and F. E. Löffler (2003). "Detoxification of vinyl chloride to ethene coupled to growth of an anaerobic bacterium." Nature 424(6944): 62.
He, J., Y Sung, R. Krajmalnik-Brown, K. M. Ritalahti and F E. Löffler (2005). "Isolation and characterization of *Dehalococcoides* sp. strain FL2, a trichloroethene (TCE)-and I, 2-dichloroethene-respiring anaerobe" Environ. Microbiol. 7(9): 1442-1450.
Heck, KN., Nutt, M.O., Alvarez, P. and Wong, M.S. (2009) "Deactivation resistance of Pd/Au nanopanicle catalysts for water-phase hydrodechlorination." Journal of Catalysis 267(2), 97-104.
Hirvonen, X, Tuhkanen, T. and Kalliokoski, P. (1996) "Treatment ofTCE-and PCE contaminated groundwater using UV/H202 and O3/H202 oxidation processes" Water Science and Technology 33(6), 67-73.
Huang, D and Becker, J .G. (2009) "Determination of intrinsic monod kinetic parameters for two heterotrophic tetrachloroethene (PCE)-respiring strains and insight into their application." Biotechnology and bioengineering 104(2), 301-311.
Inoue, D.; Tsunoda, T.; Sawada, K.; Yamamoto, N.; Saito, Y.; Sei, K.; Ike, M. "1,4-Dioxane Degradation Potential of Members of the Genera Pseudonocardia and Rhodococcus." Biodegradation 2016, 27 (4-6), 277-286. https://doi.org/10.1007/s10532-016-9772-7.
Isaka, K., Udagawa, M., Sei, K. and Ike, NL (2016) "Pilot test of biological removal of 1,4-dioxane from a chemical factory wasten, vater by gel carrier entrapping Afipia strain" D1 Journal of hazardous materials 304, 251-258.
Jin, L., Ong, S. L., & Ng, H. Y. (2013). "Fouling control mechanism by suspended biofilm carriers addition in submerged ceramic membrane bioreactors." Journal of membrane science, 427, 250-258.
Johnson, D. A. Nemir, G. L. Andersen, S. H. Zinder and L Alvarez-Cohen (2009), "Transcriptomic microarray analysis of corrinoid responsive genes in Dehalococcoides ethenogenes strain 195." FFMS Microbiol. Lett. 294(2): 198-206.

\* cited by examiner

METHODS AND SYSTEMS FOR REMOVING TRICHLOROETHANE, TRICHLOROETHENE, AND 1,4-DIOXANE FROM CONTAMINATED WATER AND WASTEWATER

CROSS-REFERENCE TO RELATED APPLICATIONS

This application is a national stage application, filed under 35 U.S.C. § 371, of International Patent Application No. PCT/US2021/037922, filed on Jun. 17, 2021, which claims the benefit of and priority to U.S. provisional patent application No. 63/040,512, filed Jun. 17, 2020, the entirety of the disclosure of which is hereby incorporated by this reference thereto.

FIELD OF THE INVENTION

The invention relates to systems and methods for removing trichloroethane (TCA), trichloroethene (TCE), and 1,4-dioxane (1,4-D) from contaminated water or wastewater.

BACKGROUND OF THE INVENTION

The chlorinated solvents have been used for various industrial and commercial purposes, including as cleaning solutions, paint thinners and pesticides. Two of the most widely used chlorinated solvents are 1,1,1-trichloroethane (TCA) and trichloroethene (TCE). Improper disposal and accidental spills have caused these solvents to become common groundwater pollutants. Because 1,4-dioxane (1,4-D) is commonly used as a stabilizer in TCA formulations, it is frequently detected as a co-contaminant with the chlorinated solvents. TCE was used at many of the same industrial sites with TCA; thus, often groundwater is co-contaminated with 1,4-D, TCA, TCE, and their degradation products (e.g., dichoroethene (DCE), dichloroethane (DCA), vinyl chloride (VC), and monochloroethane (MCA)).

Exposure to TCA cause circulatory, liver, and nervous system problems, while exposure to TCE can lead to liver problems and increased risk of cancer. The U.S. Environmental Protection Agency (U.S. EPA) has set up the maximum contaminants level (MCL) for TCA to 200 µg/L and for TCE to 5 µg/L. Toxicological studies suggest that 1,4-D has carcinogenic potential, and 1,4-D is classified as a probable human carcinogen by the U.S. EPA and the International Agency for Research on Cancer (IARC).

Sequential reductive dechlorination, from TCA to DCA to MCA to ethane, or from TCE to DCE to VC to ethene, is regarded as one of the most effective processes to remove chlorinated hydrocarbon contaminants. Biological processes have been widely tested for TCE and TCA removal due to their low cost. In particular, reductive dechlorination of TCA/TCE to ethane/ethene in situ in microcosms and in bioreactors has been widely documented. The main challenges of these anaerobic processes include maintaining strictly anaerobic conditions, a long start-up period, necessarily long hydraulic retention time (HRT: usually no less than 24 hours), lack of dechlorinating microorganisms (particularly Dehalococcoides) in the biofilm, competition for $H_2$ with methanogenesis and homoacetogenesis, and the potential accumulation of more toxic daughter products. Furthermore, besides the inhibition among chlorinated ethenes (more chlorinated ethenes inhibit less chlorinated ethenes), co-occurrence of TCE and TCA leads to mutual inhibition of TCE and TCA towards biological reduction of each other as well as their intermediates. Therefore, the application of simultaneous bioreduction of TCE and TCA is not a secure technology in reality.

Catalytic reductive dechlorination has been widely researched as an alternative method to remove TCE. Palladium nanoparticles are one of the most widely researched catalysts for reductive hydrodechlorination of various chlorinated organic pollutants. Long-term continuous operation for efficient catalytic removal of TCA and TCE in practice, however, has seldom been achieved due to a number of drawbacks including high energy input (e.g. high temperature and pressure) for catalyst synthesis, catalyst deactivation, and catalyst leaching.

Various microorganisms have been proven to metabolically or co-metabolically co-oxidize 1,4-D. The co-contaminants chlorinated solvents can inhibit the biodegradation of 1,4-D, which makes the simultaneous removal of these co-contaminants a huge challenge for environmental engineering. Adding extra electron donor and carbon source can promote the co-oxidation of 1,4-D. The unused electron donor and carbon source in the reactor effluent cause secondary contamination by stimulating growth of microorganisms in the water distribution system.

Accordingly, systems and methods that can overcome the challenges of inhibition and secondary contamination are needed for removal of TCA, TCE, and 1,4-D from contaminated water.

SUMMARY OF THE INVENTION

The disclosure relates to methods related to the removal of trichloroethane (TCA), trichloroethene (TCE), and 1,4-dioxane (1,4-D) from contaminated water or wastewater and to systems for the practice of such methods. In some aspects, the methods are directed to the formation of a catalyst film capable of removing TCA and TCE. In other aspects, the methods are directed to the formation of an ethane-oxidizing biofilm capable of 1,4-D degradation. The described systems for the removal of TCA, TCE, and 1,4-D utilize bioreactor systems that enable controlled $H_2$ delivery through bubble-less gas-transfer membranes to a biofilm capable of coupled precious metal catalysis and biodegradation, for example, a synergistic system comprising a reactor with a catalyst film and a reactor with an ethane-oxidizing biofilm.

In one aspect, a system for removing TCA, TCE, and 1,4-D contaminants from a fluid is disclosed. The system comprises a first reactor comprising a catalyst film that reduces TCA and TCE and a second reactor comprising a biofilm that oxidizes 1,4-D. The first reactor and the second reactor are in fluid connection.

The first reactor comprises the catalyst film, which comprises precious metal nanoparticles with diameters of 5-40 nm: a first nonporous membrane comprising a gas-phase side and a liquid-phase side, wherein the catalyst film is deposed on the liquid-phase side of the first nonporous membrane; and a $H_2$ gas source. The $H_2$ gas source delivers hydrogen to the gas-phase side of the first nonporous membrane and the precious metal nanoparticles, and the $H_2$ gas catalyze the reduction of TCA and TCE. In some aspects, the catalyst film consists of precious metal nanoparticles with a mean diameter of less than 19 nm, for example where the precious metal nanoparticles are palladium nanoparticle.

The second reactor comprises the biofilm: a second nonporous membrane comprising gas-phase side and a liquid-phase side, wherein the biofilm is deposed on the liquid-phase of the second nonporous membrane; and an $O_2$ gas source, wherein the $O_2$ gas source delivers oxygen to the gas-phase side of the second non-porous membrane. In some aspects, the biofilm comprises microorganisms capable of degrading ethane and 1,4-D.

In other aspects of the system for removing TCA, TCE, and 1,4-D contaminants from a fluid, the first reactor comprises a catalyst-precursor medium: a $H_2$ gas source; and a first nonporous membrane comprising a gas-phase side and a liquid-phase side. The catalyst precursor medium comprises a precious metal salt and a liquid solvent. The liquid-phase side of the first nonporous membrane is in fluid contact with the catalyst-precursor medium. The $H_2$ gas source delivers hydrogen to the gas-phase side of the first nonporous membrane thereby reducing the precious metal salt in the catalyst-precursor medium into the elemental form of the precious metal. The elemental form of the precious metal deposes on the liquid-phase side of the first nonporous membrane. The second reactor comprises a microorganism-enrichment medium comprising comprises ethane and/or 1,4-D; an inoculant comprising microorganisms capable of degrading ethane and 1,4-D; an $O_2$ gas source; and a second nonporous membrane comprising gas-phase side and a liquid-phase side. The liquid-phase side of the second nonporous membrane is in fluid contact with the microorganism-enrichment medium. The $O_2$ gas source delivers oxygen to the gas-phase side of the second nonporous membrane; and the microorganisms capable of degrading ethan and 1,4-D produces a biofilm on the liquid-phase side of the nonporous membrane in the presence of the microorganism-enrichment.

In certain embodiments of the system for removing TCA, TCE, and 1,4-D contaminants from a fluid, the precious metal concentration in the catalyst-precursor medium is 0.01-100 mM. For example, the catalyst precursor medium comprises 0.01-100 mM $Pd^{2+}$. In some aspects, the pH of the catalyst-precursor medium is 6-8.

For the systems described herein, fluid flows from the first reactor to the second reactor. For example, the fluid flows at a hydraulic retention time (HRT) of no more than 24 hours.

Also described are a method of removing TCA, TCE, and 1,4-D contaminants from a fluid. The method comprises contacting a fluid comprising TCA and TCE with a catalyst film to produce a fluid comprising 1,4-D, wherein the catalyst film comprises precious metal nanoparticles with diameters of 5-40 nm. The fluid comprising 1,4-D is then contact with a biofilm to produce a fluid comprising $CO_2$, wherein the biofilm comprises microorganisms capable of degrading 1,4-D. Accordingly, the catalyst film reduces TCA and TCE, while the biofilm degrades 1,4-D to ultimately remove TCA, TCE, and 1,4-D contaminants from the fluid. In particular embodiments, the fluid comprising TCA and TCE flows at a hydraulic retention time (HRT) of no more than 24 hours.

In some aspects, the method of removing TCA, TCE, and 1,4-D further comprises establishing the catalyst film. Thus, the method further comprises establishing a first reactor, wherein the first reactor comprises the catalyst film. The method of establishing the catalyst film and the first reactor comprises providing a first nonporous membrane having a gas-phase side and a liquid-phase side. The liquid-phase side of the first nonporous membrane is contacted with a catalyst-precursor medium. The gas-phase side of the first nonporous membrane is contacted with $H_2$ gas at a sufficient partial pressure to convert at least 90% of the precious metal salt in the precious metal medium to elemental form the catalyst-precursor medium comprising a precious metal salt and a solvent. The elemental form of the precious metal is in the form of a nanoparticles and is deposed on the liquid-phase side of the first nonporous membrane.

In certain implementations, the precious metal concentration in the catalyst-precursor medium is 0.01-100 mM. In some aspects, the pH of the catalyst-precursor medium is 6-8.

The method of removing TCA, TCE, and 1,4-D also may further comprise establishing the biofilm. Thus, the method further comprises establishing a second reactor, wherein the second reactor comprises the biofilm. The method of establishing the biofilm and the second reactor comprises submerging a second nonporous membrane with a microorganism-enrichment medium comprising dissolved ethane and/or 1,4-D; contacting an inoculant with the second nonporous membrane, wherein the inoculant comprises microorganisms capable of degrading ethane and 1,4-D; and pressurizing the gas-phase side of the second nonporous membrane with $O_2$ gas at desired partial pressure. In some aspects, the microorganism-enrichment medium further comprises salts of macronutrients, salts of micronutrients, and/or phosphate salts.

In some aspects, a method of establishing a catalyst film for reduction of TCA and TCE is disclosed. The method comprises providing a nonporous membrane, wherein the nonporous membrane comprises a gas-phase side and a liquid-phase side; contacting the liquid-phase side of the nonporous membrane with a precious metal medium comprising a precious metal salt and a solvent, wherein the concentration of the precious metal in the precious metal medium is 0.1-100 mMt; and contacting the gas-phase side of the nonporous membrane with hydrogen ($H_2$) gas at a sufficient partial pressure to convert at least 90% of the precious metal salt in the precious metal medium to elemental form. The elemental form of the precious metal is in the form of nanoparticles with a diameter of 5-40 nm, and the nanoparticles are deposed on the liquid-phase side of the nonporous membrane to form the catalyst film.

A method of establishing a synergistic system for reducing of TCA and trichloroethene TCE and degrading 1,4-D is also described. The method comprises establishing a first reactor comprising a catalyst film and a $H_2$ gas source and establishing a second reactor comprising a biofilm and a $O_2$ gas source. The catalyst film reduces TCA and TCE to produce ethane and 1,4-D, which are degraded by the biofilm. Thus, in some embodiments, the method comprises providing a first nonporous membrane, wherein the first nonporous membrane comprises a gas-phase side and a liquid-phase side; contacting the liquid-phase side of the first nonporous membrane with a catalyst-precursor medium, the catalyst-precursor medium comprising a precious metal salt and a solvent; contacting the gas-phase side of the first nonporous membrane with $H_2$ gas at a sufficient partial pressure to convert at least 90% of the precious metal salt in the precious metal medium to elemental form, wherein the elemental form of the precious metal is in the form of a nanoparticles with diameters of 5-40 nm and the precious metal nanoparticles are deposed on the liquid-phase side of the first nonporous membrane to form a catalyst film. The method further comprises providing a second nonporous membrane, wherein the second nonporous membrane comprises a gas-phase side and a liquid-phase side: submerging the second nonporous membrane with a microorganism-enrichment medium comprising dissolved ethane and/or 1,4-D; contacting an inoculant with the liquid-phase side of the second nonporous membrane, wherein the inoculant comprises microorganisms capable of degrading ethane and 1,4-D; and pressurizing the gas-phase side of the second nonporous membrane with $O_2$ gas at desired partial pressure thereby forming a biofilm comprising microorganisms capable of degrading ethane and 1,4-D on the liquid-phase side of the second nonporous membrane. Accordingly, in some aspects, the first nonporous membrane is in a first reactor: the second nonporous membrane is in a second reactor; and the first reactor and the second reactor are in fluid connection.

In particular embodiments of the methods and systems described herein, the precious metal is a platinum group metal, for example, palladium. In certain embodiments of the methods and systems described herein, the nonporous membranes are hollow-fiber membranes. In some aspects, the wall thickness of the hollow-fiber membranes is 50-55 µm. In some aspects, the outer diameter of the hollow-fiber membranes is 200 µm and/or the inner diameter of the hollow-fiber membranes is 100-110 µm. In particle embodiments, the nonporous membranes are made of a polymeric material selected from the group consisting of: polypropylene, polyurethane, polysulfone, and composite forms.

BRIEF DESCRIPTION OF THE DRAWINGS

FIG. 3A-1 depicts, in accordance with certain embodiments, 1,4-D degradability by *Rhodococcus ruber* 219 without an added carbon source and electron donor.

FIG. 3A-2 depicts, in accordance with certain embodiments, 1,4-D degradability by *R. ruber* 219 with acetate as the carbon source and electron donor.

FIG. 3A-3 depicts, in accordance with certain embodiments, 1,4-D degradability by *R. ruber* 219 with ethane as the carbon source and electron donor.

FIG. 3B-1 depicts, in accordance with certain embodiments, 1,4-D degradability by wastewater treatment plant (WWTP) activated sludge without an added carbon source and electron donor.

FIG. 3B-2 depicts, in accordance with certain embodiments, 1,4-D degradability by WWTP activated sludge with acetate as the carbon source and electron donor.

FIG. 3B-3 depicts, in accordance with certain embodiments, 1,4-D degradability by WWTP activated sludge with ethane as the carbon source and electron donor.

FIG. 3C-1 depicts, in accordance with certain embodiments, 1,4-D degradability by landfill leachate without an added carbon source and electron donor.

FIG. 3C-2 depicts, in accordance with certain embodiments, 1,4-D degradability by landfill leachate with acetate as the carbon source and electron donor.

FIG. 3C-3 depicts, in accordance with certain embodiments, 1,4-D degradability by landfill leachate with ethane as the carbon source and electron donor.

FIG. 3D-1 depicts, in accordance with certain embodiments, 1,4-D degradability by wetland sediment without an added carbon source and electron donor.

FIG. 3D-2 depicts, in accordance with certain embodiments, 1,4-D degradability by wetland sediment with acetate as the carbon source and electron donor.

FIG. 3D-3 depicts, in accordance with certain embodiments, 1,4-D degradability by wetland sediment with ethane as the carbon source and electron donor.

FIGS. 7A and 7B depict, in accordance with certain embodiments, the composition of the inoculant and biofilm. FIG. 7A shows the bacterial community of the inoculum and biofilms of phases 0, III, and IV. Phylotypes are presented at the family level based on 16S rRNA gene amplicon sequencing. FIG. 7B shows the dominant phylotypes at the genus level in biofilm of phases 0, III, and IV.

DETAILED DESCRIPTION OF THE INVENTION

Detailed aspects and applications of the invention are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. It should be noted that there are many different and alternative configurations, devices and technologies to which the disclosed inventions may be applied. The full scope of the inventions is not limited to the examples that are described below.

The singular forms "a," "an," and "the" include plural referents unless the context clearly dictates otherwise. Thus, for example, reference to "a step" includes reference to one or more of such steps.

The term "about" when used in the context of numeric values denotes an interval of accuracy that is familiar and acceptable to a person skilled in the art. The interval is =10% of the given numeric value, +5% of the given numeric value, or +2% of the given numeric value.

As used herein, the term "precious metal" refers to gold (Au), silver (Ag), and platinum group metals (PGM). The members of PGM include platinum (Pt), palladium (Pd), ruthenium (Ru), rhodium (Rh), osmium (Os), and iridium (Ir).

As used herein, the terms "precious metal-film" and "catalyst film" refer to a film of precious metal nanocatalysts.

Currently, no physical-chemical treatment method or biological treatment method exist that can efficiently destroy trichloroethane (TCA), trichloroethene (TCE), and 1,4-dioxane (1,4-D). While TCA, TCE, and 1,4-dioxane often occur together in contaminated water and wastewater, these contaminants inhibit each other's biodegradation. Described herein are methods and systems for removing TCA, TCE, and 1,4-D from contaminated water or wastewater by taking advantage of catalytic and biological processes for synergistic removal of TCA, TCE, and 1,4-D. Specifically, the described methods and systems address the current deficiencies in commercial application of removing TCA, TCE, and 1,4-D from contaminated water and wastewater by efficiently converting TCA and TCE into harmless ethane and $Cl^-$. TCA and TCE is initially converted to 1,4-D via by catalysis in a first reactor (also referred to herein as a "Cata-reactor" or "$H_2$-MCfR"), and then converting 1,4-D into harmless $CO_2$ in a second reactor (also referred to herein as a "Bio-reactor" or "$O_2$-MBfR") by microbial biodegradation.

1. Synergistic System for Removal of TCA, TCE, and 1,4-D

In one embodiment, the system comprises a first reactor for $H_2$-induced reduction of TCA and TCE and a second reactor for $O_2$-induced oxidization of 1,4-D. The first reactor catalytically reduces TCA and TCE. The second reactor utilizes biological processes to oxidize 1,4-D. The first reactor is fluidly connected to the second reactor, wherein the effluent of the first reactor is the influent of the second reactor. In certain implementations, the influent of the concentration of TCA and TCE to the first reactor is less than 400 µM total or the concentration of TCA is less 200 µM and the concentration of TCE is less 200 µM. In some embodiments, the first reactor is a reactor with catalysts ("Cata-reactor"), and a second reactor is reactor with microorganisms ("Bio-reactor").

In certain nonlimiting embodiments, the system comprises at least one membrane, a hydrogen-gas source, and an oxygen-gas source. In some aspects, the first reactor comprises a membrane and a hydrogen ($H_2$) gas source, while the second reactor comprises a membrane and an oxygen ($O_2$) gas source. In certain implementations, the first reactor comprises a membrane, a catalyst film, and a $H_2$ gas source, while the second reactor comprises a membrane, a biofilm, and an $O_2$ gas source. The catalyst film and the biofilm are each anchored on the membrane of their respective reactor. Accordingly, the catalyst film is anchored on an $H_2$-delivering membrane, while the biofilm is anchored on an $O_2$-delivering membrane. In other words, the catalyst film is deposed on the liquid-phase side of the membrane of the first reaction, while the biofilm is deposed on the liquid-phase side of the membrane of the second reactor.

The catalyst film reduces TCA and TCE and comprises precious metal nanoparticles with a mean diameter of 15-20 nm. In some aspects, the diameters of the precious metal nanoparticles are between 5-40 nm. In some aspects, at least 80% of the precious metal nanoparticles have diameters of less than 25 nm. In particular embodiments, the mean diameter of the precious metal nanoparticles is about 19 nm. In some aspects, the catalyst film consists of the precious metal nanoparticles. In certain embodiments, the precious metal nanoparticles are monometallic palladium nanoparticles (PdNPs). Accordingly, in some aspects, the catalyst film is a Pd-film, which consist of monometallic palladium nanoparticles. To form the catalyst film, the $H_2$ gas in the first reactor functions as the electron donor to drive reduction of the soluble precious metals (with an oxidation state of +2 or +3) to elemental precious metals (with an oxidation state of 0), which spontaneously deposit as catalysts on the liquid-phase side of a membrane. In some aspects, the catalyst film is deposed directly on the liquid-phase side of the membrane.

The biofilm biodegrades or oxidizes 1,4-D. In some aspects, the biofilm comprises ethane-oxidizing bacteria. In some embodiments, the biofilm comprises bacteria from at least one genus selected from the group consisting of: *Methyloversatilis, Pseudonocardia, Bradyrhizobium* and *Rhodococcus*. In some aspects, the biofilm comprises bacteria from at least one genus selected from the group consisting of: *Methyloversatilis, Pseudonocardia*, and *Bradyrhizobium*. The biofilm is also deposed on the liquid-phase side of a membrane. In some aspects, the biofilm is deposed directly on the liquid-phase side of the membrane.

In some implementations, for example, to establish a system for synergistic removal of TCA, TCE, and 1,4-D, the system further comprises a catalyst-precursor medium, a microorganism-enrichment medium, and an inoculant comprising a biofilm-forming population of microorganisms. For example, the first reactor comprises a catalyst-precursor medium, while the second reactor comprises a microorganism-enrichment medium and an inoculant comprising a biofilm-forming population of microorganisms.

Compared to other TCA/TCE-removing technologies, such as advanced oxidation, photocatalysis processes, and biological processes, the Cata-reactor is inexpensive to operate in that the only reagent that needs to be continuously supplied is $H_2$ gas. $H_2$ gas is nontoxic and can be generated on-site and on-demand. Furthermore, on-demand delivery of $H_2$ gas in a bubble-free form enabled by the nonporous membrane is safe, efficient, controllable, and prevents stripping volatile TCA and TCE. Another improvement of the Cata-reactor over the current technologies for removing TCA and TCE is that the Cata-reactor requires no input of energy-consumables or environmentally unfriendly reagents, such as UV light, ozone, hydrogen peroxide, or peroxysulfates. Accordingly, the Cata-reactor results in substantial saving of energy and cost in catalyst synthesis compared to conventional abiotic synthesis approaches with high energy input yet low catalyst yield. Additionally, reducing TCA and TCE using the Cata-reactor does not encounter the problem in bioreduction of TCA and TCE, for which the TCA and TCE mutually inhibit their reductions. Furthermore, reducing TCE using the Cata-reactor does not produce toxic intermediates like vinyl chloride during bioreduction of TCE.

Compared to existing technologies for removing 1,4-D, the Bio-reactor does not require energy demand for aeration, which accounts for the greatest portion of operation costs of conventional aerobic treatment. The Bio-reactor also does not require the addition of organic carbon and therefore does not result in secondary contamination. Because $O_2$ is provided on demand in the bioreactor, cost can also be controlled for optimal performance. Additionally, residual reductive dechlorination products from TCA and TCE are mineralized in the Bio-reactor. The combined use of the Cata-reactor with the Bio-reactor minimizes inhibition of chlorinated hydrocarbons (TCA and TCE and the undesired chlorinated intermediates) on 1,4-D biodegradation.

a. Membrane:

The membrane used in the first reactor and the second reactor typically do not have pores in its wall (e.g., a nonporous membrane). The lack of pores in the membrane enables transferring gas (e.g., hydrogen or oxygen) in a bubble-free form at controllable rates. In some embodiments, the membrane is a hollow-fiber membrane. In such embodiments, gas is supplied to the lumen of the hollow-fiber membrane (the gas-phase side). Accordingly, catalyst film or biofilm would be anchored to the outer surface of the hollow-fiber membrane (the liquid-phase side). In other embodiments, the membrane is a flat- or curled-sheet membrane. In such embodiments, gas (for example, hydrogen for the first reactor and oxygen for the second reactor) is supplied to one side of the sheet membrane (the gas-phase side), while catalyst film or biofilm anchored to the other surface of the sheet membrane (the liquid-phase side).

The membrane may be made of a variety of polymeric materials, for example polypropylene, polyurethane, polysulfone, or composite forms. In certain embodiments, the thickness of the gas transfer membrane is may be 50-70 μm, for example between 50-55 μm.

In particular embodiments, the gas transfer membrane is a nonporous polypropylene hollow-fiber membrane (200 μm OD, 100-110 μm ID, wall thickness 50-55 μm).

b. Catalyst-Precursor Medium

The catalyst-precursor medium provides the soluble precious metals (with an oxidation state of +2 or +3) for the production of the catalyst film. The catalyst-precursor medium comprises at least one precious metal precursor/salt, for example, gold (Au), silver (Ag), platinum (Pt), palladium (Pd), ruthenium (Ru), rhodium (Rh), osmium (Os), or iridium (Ir). In certain embodiments, the precious metal precursor is any chemical that rapidly dissolve in the solvent and release soluble precious metal ions (for example, $Ru^{3+}$ released from ruthenium chloride ($RuCl_3$)) or soluble precious metal complexes of various ligands (for example, $(PdCl_4)^{2+}$ released from sodium tetrachloropalladate ($Na_2PdCl_4$)). The precious metal concentration is applied in a range of 0.01-100 mM. In certain embodiments, the precious metal concentration range in the catalyst-precursor medium is 0.1-5 mM, for example, about 0.1 mM, 0.1±0.05 mM or 0.94 mM. In some embodiments, the catalyst-precursor medium comprises acids (for example, hydrochloric acid), bases (for example, sodium hydroxide), and/or pH buffers (for example, potassium phosphate species) to adjust the pH to a desired value in the range of 4-10. In particular embodiments, the pH range of the catalyst-precursor medium is 6-8.

In some aspects, the catalyst-precursor medium comprises a liquid solvent. The liquid solvent may be water, salt solution, hydrochloric acid, methanol, ethanol, acetonitrile, toluene, dichloromethane, chloroform, or tetrahydrofuran. In certain embodiments, the liquid solvent is deionized water.

c. Microorganism-Enrichment Medium

The microorganism-enrichment medium stimulates sufficient microbial growth to establish and/or maintain the biofilm. The microorganism-enrichment medium comprises dissolved ethane as the primary carbon source. In some embodiments, the medium comprises 1,4-D as the secondary electron donor and carbon source. In certain aspects, the microorganism-enrichment medium comprises salts of a full spectrum of macronutrients, such as calcium (Ca), magnesium (Mg), phosphorus (P), sodium (Na), potassium (K), and iron (Fe). In some aspects, the growth medium also comprises salts of micronutrients, for example, zinc (Zn), manganese (Mn), boron (B), cobalt (Co), copper (Cu), nickel (Ni), molybdenum (Mo), and selenium (Se). In other embodiments, the growth medium comprises mixed phosphate salts (for example, $H_3PO_4$, $NaH_2PO_4$, $Na_2HPO_4$, and $Na_3PO_4$) as pH buffers.

d. Inoculant

The inoculant comprises microorganisms capable of degrading ethane and 1,4-D. The microorganisms in the inoculant form a biofilm that is anchored to the membrane. In some embodiments, the inoculant is lake sediments, wetland sediments, or mixtures thereof. In other embodiments, the inoculant comprises at least one pure strain, activated sludge collected from aerobic zones of wastewater treatment plants, landfill leachate, or their mixtures.

In some aspects, the inoculant comprises bacteria from at least one family selected from the group consisting of Rhodocyclaceae, Pseudonocardiaceae, Brandyrhizobiaceae, and Chitinophagaceae. In certain embodiments, the inoculant comprises bacteria from at least one genus selected from the group consisting of: *Methyloversatilis, Pseudonocardia, Bradyrhizobium* and *Rhodoccocus*. In particular embodiments, the inoculant comprises *Methyloversatilis*.

e. $H_2$-Gas Source

The $H_2$-gas source can be any reliable source of $H_2$ gas for the first reactor, for examples, a gas storage tank having pressurized $H_2$ gas, a $H_2$ generator via water electrolysis, or a methane reformer. In some embodiments, the $H_2$ purity is over 99%. In other embodiments, the $H_2$-gas source include a built-in or external gas pressure regulator. The gas pressure regulator regulates the pressure of $H_2$ gas from the gas storage tank to the gas-phase side of the membrane in the first reactor. In some aspects, the $H_2$-gas source delivers $H_2$ gas to the gas-phase side of the membrane in the first reactor at partial pressures of 1-10 psig, for example about 3 psig or 3±0.25 psig for establishing the catalyst film and 3-5 psig for reduction of TCA and TCE.

f. $O_2$-Gas Source

The $O_2$-gas source can be any reliable source of $O_2$ gas for the second reactor, for example, a gas storage tank having pressurized $O_2$ gas or air, an air pump, or an $O_2$-gas generator. In some embodiments, the $O_2$ purity is over 99%. In other embodiments, the $O_2$ source can be air (~21% $O_2$).

The $O_2$-gas source includes a built-in or external gas pressure regulator. The gas pressure regulator regulates the pressure of $O_2$ gas from the $O_2$-gas source to the gas-phase side of the membrane in the second reactor. In some aspects, the $O_2$-gas source delivers $O_2$ gas to the gas-phase side of the membrane in the second reactor at partial pressures of 1-15 psig, for example about 10 psig for establishing the biofilm and around 3 psig for biodegradation of 1,4-D.

2. Methods for Removal of TCA, TCE, and 1,4-D

The method of removing TCA, TCE, and 1,4-D comprises reducing TCA and TCE in an $H_2$-induced reaction catalyzed by precious metals and oxidizing 1,4-D in an $O_2$-induced reaction mediated by microorganisms. The method be easily and accurately regulated to achieve minimal residues of TCA and TCE that inhibit subsequent 1,4-D biodegradation and maximize production of ethane that promote 1,4-D biodegradation. The regulations include adjusting the $H_2$ gas provided to the Cata-reactor, the pH of fluid comprising TCA, TCE, and 1,4-D that is provided to the Cata-reactor, the concentration of TCA, TCE, and/or 1,4-D in the fluid provided to the system and thus the Cata-reactor, and the hydraulic retention time (HRT) of the fluid provided to the system and thus the Cata-reactor. In particular implementations, the pH of the fluid comprising TCA and TCE (the influent to the Cata-reactor) is about 7, and the mole ratio of ethane to 1,4-D in the effluent of the Cata-reactor (thus influent to the Bio-reactor) is 300. In certain implementations, the partial pressure of $H_2$ gas provided to the Cata-reactor is 3-5 psig, for example, about 3 psig, 3±0.3 psig, about 4 psig, 4±0.4 psig, about 5 psig or 5±0.5 psig. In certain implementations, the partial pressure of $O_2$ gas provided to the Bio-reactor is 1-3 psig, for example, about 1 psig, 1±0.2 psig, about 2 psig. 2±0.2 psig, about 3 psig, or 3±0.3 psig.

In some implementations, the method comprises establishing a catalyst film in a first reactor and establishing a biofilm in a second reactor, wherein the catalyst film reduces TCA and TCE and the biofilm causes the oxidation of 1,4-D. In some aspects, the precious metal catalysts are deposed on a nonporous $H_2$-delivery membrane as catalyst film, while the microorganisms are deposed on a nonporous $O_2$-delivery membrane as biofilm.

The method of generating a catalyst film comprises providing an aqueous system comprising nonporous membrane; providing the system with catalyst-precursor medium to submerge the membrane into the solution of precious metal precursors; and pressurizing the gas-phase side of the membrane with $H_2$ at desired partial pressure. In some aspects, the desired partial pressure of $H_2$ gas to establish the catalyst film is 1-5 psig, for example, 2-4 psig, about 3 psig. 3±0.3 psig, or 3 psig. The $H_2$ gas donates electrons for the reduction of the soluble precious metals in the catalyst-precursor medium to elemental precious metals, which spontaneously deposit as catalysts on the membrane, particularly the liquid-phase side of the membrane. This coating of precious metal nanoparticles deposed on the membrane is the catalyst film, which is capable of reducing TCA and TCE. In certain embodiments, the loading density of the catalyst film is about 0.07 mmol/m² or about 7.7 mg/m².

In some aspects, the method of generating a catalyst film is a method of establishing the first reactor. In particular implementations, this method comprises contacting the liquid-phase side of the nonporous membrane with a catalyst-precursor medium. Meanwhile, the gas-phase side of the nonporous membrane is contacted with $H_2$ gas at a sufficient partial pressure to convert at least 90% of the precious metal salt in the catalyst-precursor medium to elemental form with a mean diameter of 15-20 nm. In some aspects, at least 99% of the precious metal salt in the catalyst-precursor medium is converted to elemental form. In particular embodiments, the gas-phase side of the nonporous membrane is contacted with $H_2$ gas at a sufficient partial pressure to convert the precious metal salt in the catalyst-precursor medium to elemental form nanoparticles with diameters of 5-40 nm. In some aspects, the desired partial pressure of $H_2$ gas to establish the catalyst film is 1-5 psig, for example, 2-4 psig, about 3 psig, or 3 psig. In certain embodiments, the loading density of the catalyst film is about 0.07 mmol/m² (about 7.7 mg/m²) or 0.07±0.007 mmol/m² (7.7±0.08 mg/m²).

The method of generating a biofilm is a method of establishing the second reactor. This method comprises submerging a nonporous membrane with a microorganism-enrichment medium; contacting an inoculant with the nonporous membrane; and pressurizing the gas-phase side of the membrane with $O_2$ at desired partial pressure. In some aspects, the desired partial pressure of $O_2$ gas to establish the biofilm is 5-15 psig. 8-12 psig, 9-11 psig, or about 10 psig. The second reactor is continuously or repeatedly feed with the microorganism-enrichment medium. In some embodiments, the microorganism-enrichment medium is provided to the inoculated aqueous system at a HRT of 0.1-48 hours. In some embodiment, the HRT is between 4-20 hours. In other embodiments, the system is continuously fed with the microorganism-enrichment medium for 2-24 weeks.

Illustrative, Non-Limiting Examples in Accordance with Certain Embodiments

The disclosure is further illustrated by the following examples that should not be construed as limiting. The contents of all references, patents, and published patent applications cited throughout this application, as well as the Figures, are incorporated herein by reference in their entirety for all purposes.

1. Formation of Pd-Film on $H_2$-Delivering Membrane in Cata-Reactor.

Figure 1A:
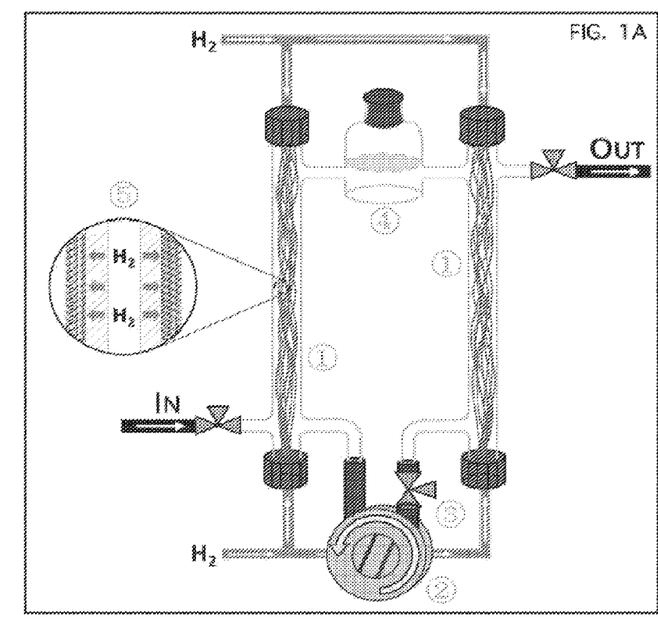
FIG. 1A illustrates a schematic of a bench-scale form of the first reactor of the system in accordance with certain embodiments described herein. (1) Glass tube containing a fiber bundle; (2) recirculation pump; (3) liquid sampling port; (4) airtight bottle with headspace for gas sampling; and (5) palladium nanoparticles (PdNPs) coated on fiber surfaces.
Figure 1B:
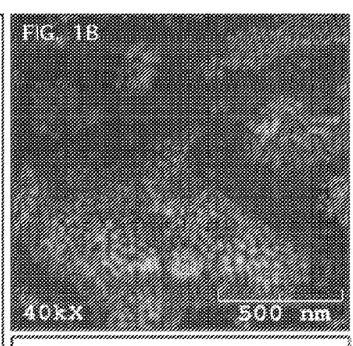
FIG. 1B depicts, in accordance with certain embodiments, a scanning electron microscopic (SEM) image of PdNPs coated on fiber surfaces.
Figure 1C:
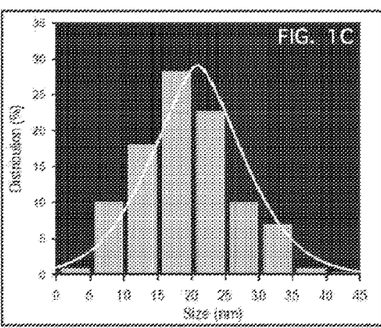
FIG. 1C depicts, in accordance with certain embodiments, the size distribution histogram of the PdNPs coated on fiber surfaces.
Figure 1D:
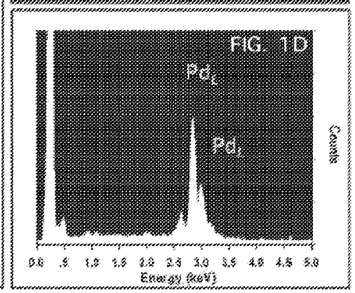
FIG. 1D depicts, in accordance with certain embodiments, the (energy-dispersive X-ray (EDX) spectrum of PdNPs coated on fiber surfaces.
Figure 1E:
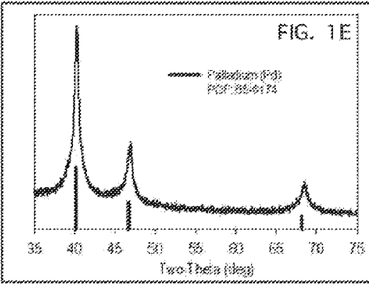
FIG. 1E depicts, in accordance with certain embodiments, the X-ray diffraction (XRD) spectrum of PdNPs coated on fiber surfaces.

The schematic in FIG. 1A shows the configuration of a bench-scale Cata-reactor. It had a total working volume of 80 mL (60 mL liquid phase and 20 mL headspace) and contained two bundles of 240 identical hollow-fiber membranes in two glass tubes (6 mm internal diameter and 27 cm length). Nonporous polypropylene fiber with 200 μm OD, 100-110 μm ID, and 50-55 μm wall thickness (Teijin, Ltd., Japan) was used. $H_2$ gas (>99.9%) was supplied to both ends of each fiber bundle at a pressure controlled by a pressure regulator. Solute concentrations inside the Cata-reactor were equal to its effluent concentrations due to mixing from a recirculation rate of 150 mL/min created by using a peristaltic pump (Masterflex, USA). A 30-mL serum bottle was set between two tubes to create gas-liquid interface; this enabled the volatile organic compounds (TCA, TCE, and their reduction products) to reach equilibrium of partitioning between the liquid phase and the headspace where gaseous samples were collected using a gas-tight syringe (Hamilton, USA).

A "fresh" coating of palladium nanoparticles (PdNPs) on the fibers was prepared right before testing TCA/TCE reduction in the Cata-reactor. The Cata-reactor was fed with a deoxygenated $Na_2PdCl_4$ solution containing ~10 mg/L of Pd(II) after purging the Cata-reactor with $N_2$ gas for 15 minutes. After the Cata-reactor was filled with the Pd solution, $H_2$ was provided and recirculation resumed, leaving the Cata-reactor in batch mode until most of the soluble Pd(II) was autocatalytically reduced to insoluble $Pd^0$ and precipitated on the fiber surfaces. Thus, the Pd-film is spontaneously deposited on the liquid-phase side of the gas transfer membrane in the presence of $H_2$ gas and the solution containing ~10 mg/L of Pd(II).

FIGS. 1B-1E present solid-state characteristics of 8 mg/m² PdNPs autocatalytically synthesized and spontaneously coated on surfaces of the gas-transfer fiber membranes. An scanning electron microscopy (SEM) image of the fiber surface (FIG. 1B) shows that the PdNPs were well dispersed as a thin layer on the fiber surface. Over 80% of the particles were less than 25 nm in diameter (FIG. 1C), yielding to an average size of 19.0 nm. The energy dispersive X-ray analysis (EDX) spectrum (FIG. 1D) confirms the presence of Pd on the fiber surface. The X-ray diffraction (XRD) pattern (FIG. 1E) reveals major diffraction peaks at 40.0° (1 1 1), 46.5° (2 0 0), and 68.1° (2 2 0); this further confirms the predominant presence of the $Pd^0$ crystal structure with dominant facets of {1 1 1}.

Figure 2A:
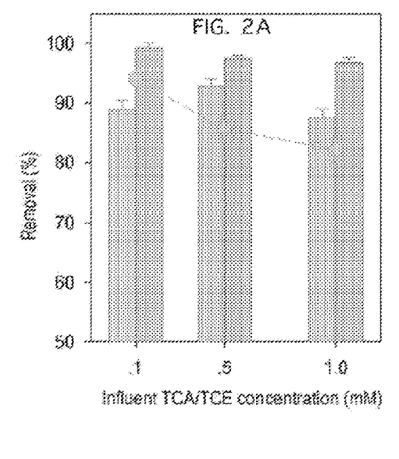
FIG. 2A depicts, in accordance with certain embodiments, TCA and TCE removal and selectivity to ethane at steady states during continuous treatment of TCE-contaminated and TCE-contaminated water in the Cata-reactor at various concentrations (mM) of influent TCA/TCE.
Figure 2B:
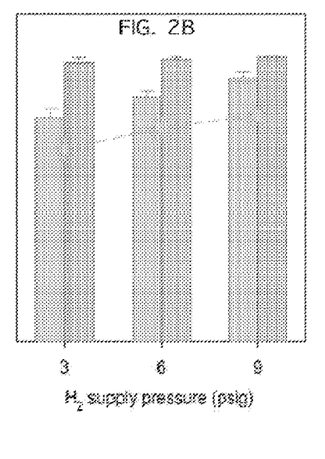
FIG. 2B depicts, in accordance with certain embodiments, TCA and TCE removal and selectivity to ethane at steady states during continuous treatment of TCE-contaminated and TCE-contaminated water in the Cata-reactor at various $H_2$ supply pressures (psig).
Figure 2C:
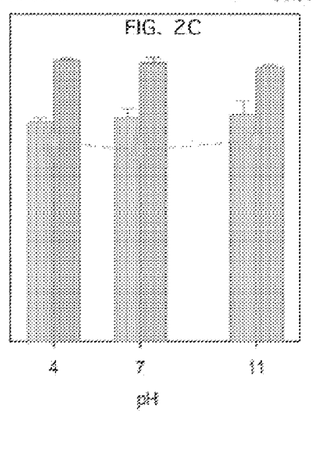
FIG. 2C depicts, in accordance with certain embodiments, TCA and TCE removal and selectivity to ethane at steady states during continuous treatment of TCE-contaminated and TCE-contaminated water in the Cata-reactor at various pH values.
Figure 2D:
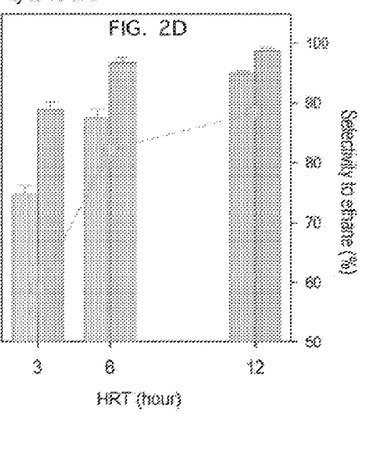
FIG. 2D depicts, in accordance with certain embodiments, TCA and TCE removal and selectivity to ethane at steady states during continuous treatment of TCE-contaminated and TCE-contaminated water in the Cata-reactor at various hydraulic retention times (HRT, hour).

The Cata-reactor was continuously fed with TCA- and TCE-containing water at varied flow rates, influent substrate concentrations, pH, and $H_2$ pressures for three months. The steady-state results summarized in FIGS. 2A-2D demonstrate that catalytic efficiency and selectivity of TCA and TCE reduction were sensitively affected by $H_2$ pressure and surface loading (determined by flow rate or HRT at a certain influent concentration). For example, Higher TCA/TCE loading (e.g. higher influent concentration in FIG. 2A or shorter HRT in FIG. 2D) lowered selectivity to ethane, while heavier $H_2$ supply (FIG. 2B) not only accelerated TCA removal but also enhanced selectivity to ethane.

2. Formation of Biofilm on $O_2$-Delivering Membrane in Bio-Reactor

Consortia capable of 1,4-dioxane biodegradation were screened from four different types of cultures: 1) pure strain of *Rhodococcus ruber* 219 purchased from Deutsche Sammlung von Mikroorganismen und Zellkulturen (DSMZ, Germany): 2) aerobic activated sludge collected from Mesa Northwest Wastewater Reclamation Plant (Mesa, AZ, USA): 3) landfill leachate collected from Salt River Landfill (Scottsdale, AZ, USA); and 4) wetland sediments collected from Tres Rios Flow-Regulating Wetlands (Tolleson, AZ, USA). The basic medium plus 1,4-D and acetate or ethane as the primary electron donor were distributed into 160-mL serum bottles, aerated with pure $O_2$ gas, and inoculated with the cultures separately.

For the Bio-reactor configuration, setup, and inoculation, a bench-scale Bio-reactor was set up and inoculated with the enriched biomass capable of 1,4-D degradation. The configuration of the Bio-reactor was identical to the Cata-reactor except that the fiber material was composite polyethylene and polyurethane and the fiber lumens were pressurized with gaseous $O_2$, not $H_2$.

To test continuous 1,4-dioxane degradation in the Bio-reactor, the Bio-reactor was filled with the basic medium plus 0.5 mM 1,4-D and saturated with ethane (up to 58 mg/L or 1.9 mM soluble ethane after sparkling with pure ethane gas). The Bio-reactor was then inoculated with the ethanotrophic culture enriched from the wetland sediment. After leaving the reactor in batch overnight, the Bio-reactor was continuously fed with the medium (hydraulic retention time controlled at 15.0±1.0 hours) to allow a biofilm to accumulate on the liquid-phase side of the gas transfer membrane.

Figure 3A:
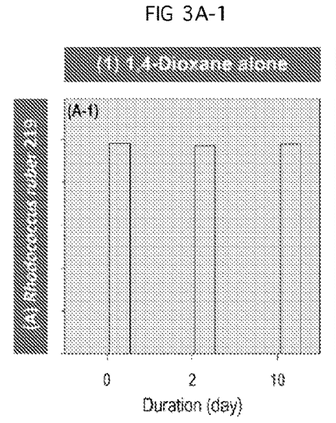
Figure 3A:
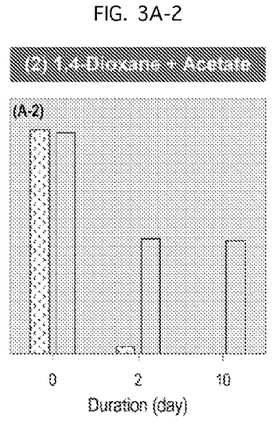
Figure 3A:
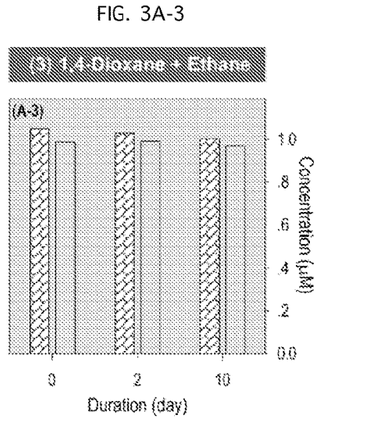
Figure 3B:
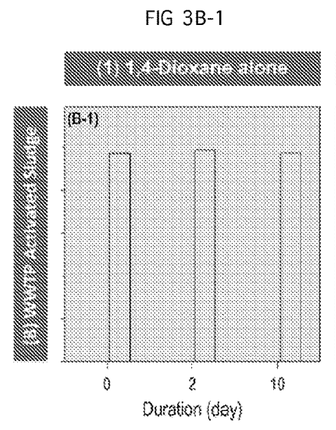
Figure 3B:
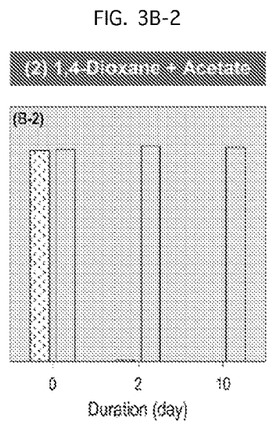
Figure 3B:
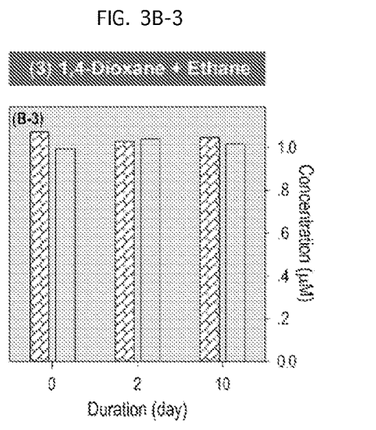
Figure 3C:
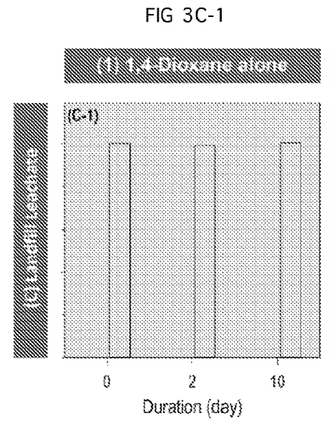
Figure 3C:
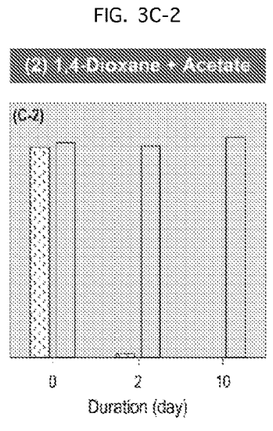
Figure 3C:
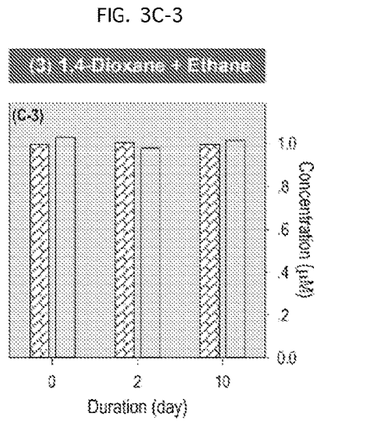

Inoculum source and primary electron donor are important for the 1,4-D-degrading culture. FIGS. 3A-1 to 3D-3 shows the biodegradation of 1,4-D by four different inoculant sources in serum-bottles tests with no primary election donor or with acetate or ethane as the primary electron donor. The consortia from activated sludge and landfill leachate were not capable of degrading 1,4-D under any conditions during the initial 10 days (FIGS. 3B-1 to 3B-3 and 3C-1 to 3C-3) or even after months of incubation. The pure *R. ruber* 219 strain was able to degrade 1,4-D only when acetate was present as the primary electron donor, but it immediately lost the capacity of 1,4-D degradation once acetate was completely depleted after two days (FIG. 3A-2).

Figure 3D:
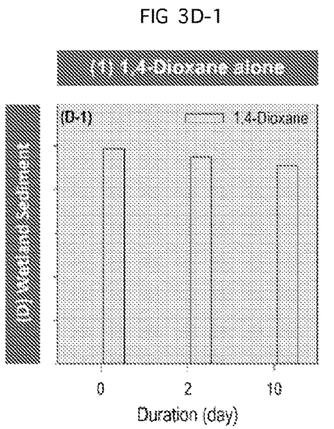
Figure 3D:
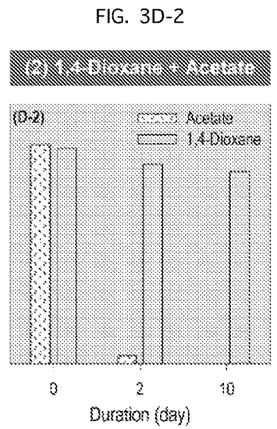
Figure 3D:
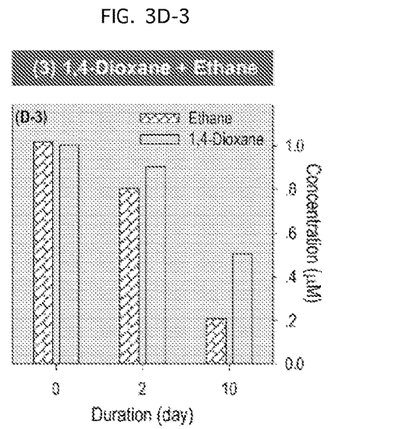

The consortium from the wetland sediment degraded on average 10% of the 1,4-D within 10 days when 1,4-D was introduced alone or with acetate (FIGS. 3D-1 and 3D-2, respectively). When ethane was present, this ethanotrophic consortium was able to degrade 1,4-D along with ethane, and over 50% of 1,4-D was depleted (FIG. 3D-3). Overall, using ethane as the primary substrate and wetland sediment as the inoculum are the most appropriate strategy for continuous stable 1,4-D degradation.

Figure 4A:
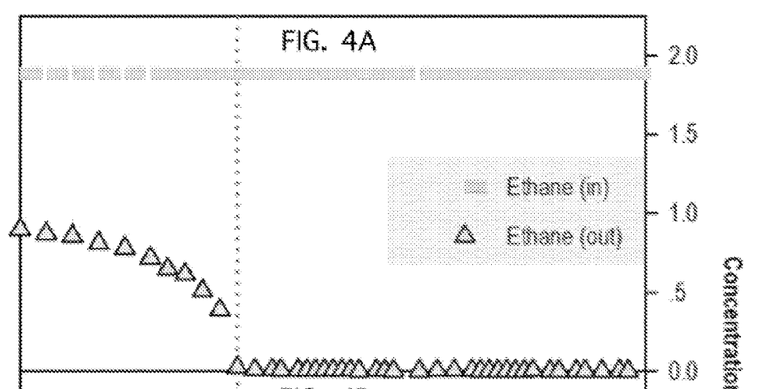
FIG. 4A depicts, in accordance with certain embodiments, the concentration profile of ethane during the initial 70 days of continuous operation at HRT of 15 hours after the bioreactor was inoculated with ethanotrophic biomass enriched from wetland sediments.
Figure 4B:
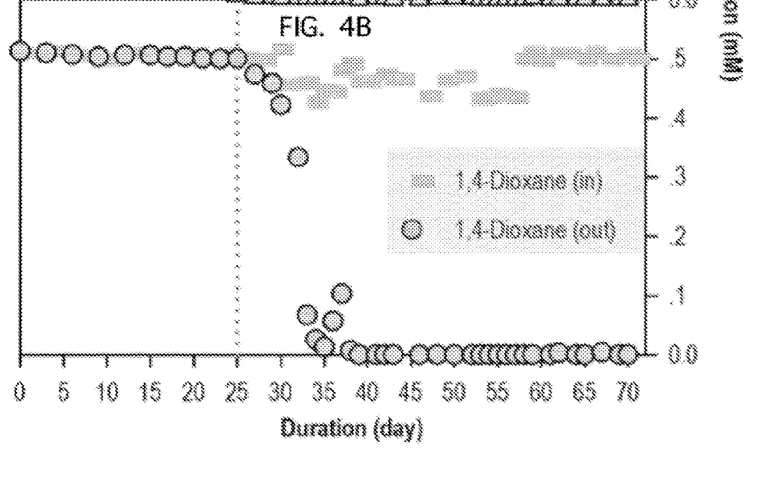
FIG. 4B depicts, in accordance with certain embodiments, the concentration profile of 1,4-D during the initial 70 days of continuous operation at HRT of 15 hours after the bioreactor was inoculated with ethanotrophic biomass enriched from wetland sediments.

Continuous removal of 1,4-D and ethane occurred in the Bio-reactor inoculated with the ethanotrophic culture. FIG. 4 presents concentration profiles of ethane and 1,4-D during the continuous operation of the Bio-reactor. Upon inoculation, ethane was gradually consumed without noticeable delay. Substantial 1,4-D removal was not initiated until Day 25 when over 99.5% of the 1.9 mM ethane from the influent was depleted (i.e. effluent concentration <10 μM). After then, 1,4-D began to be rapidly consumed. By Day 38, 1,4-D removal reached steady state at over 99.9% (i.e. effluent concentration below the detection limit of 0.6 μM), and the removal remained almost over 99% for the following 32 days as the steady state.

Figure 7A:
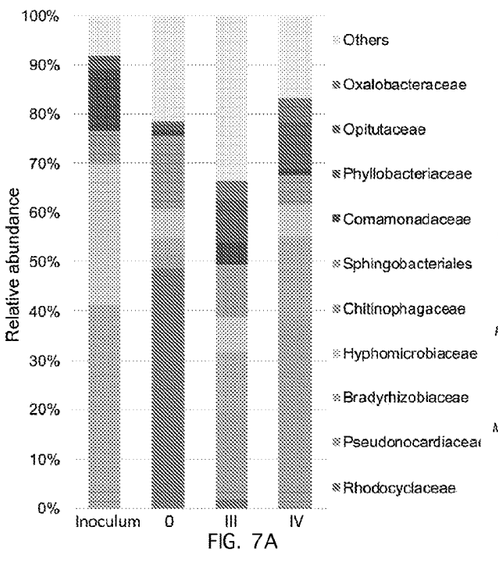
Figure 7B:
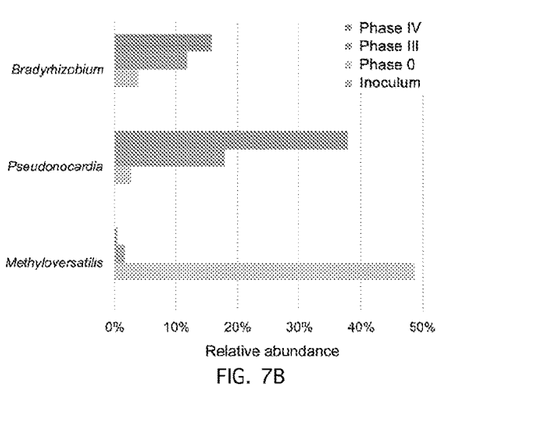

Microbial community structures in the enriched biofilm. In the biofilm after the 70-day enrichment, the genera *Methyloversatilis* dominated the biofilm community with relative abundance of 77.0% and 48.7% before and after 1,4-D degradation, respectively. *Methyloversatilis* is typical methylotrophs that can utilize various single-carbon compounds as well as short chain alkanes (C2, C3, possibly C4-C5). This genus *Methyloversatilis* was ethanotrophs in the biofilm community. In addition, the relative abundance of the 1,4-D-oxidizing genus like Pseudonocardia and *Bradyrhizobium* were augmented (FIG. 7).

3. Synergistic Removal of TCA, TCE, and 1,4-D

Figure 5:
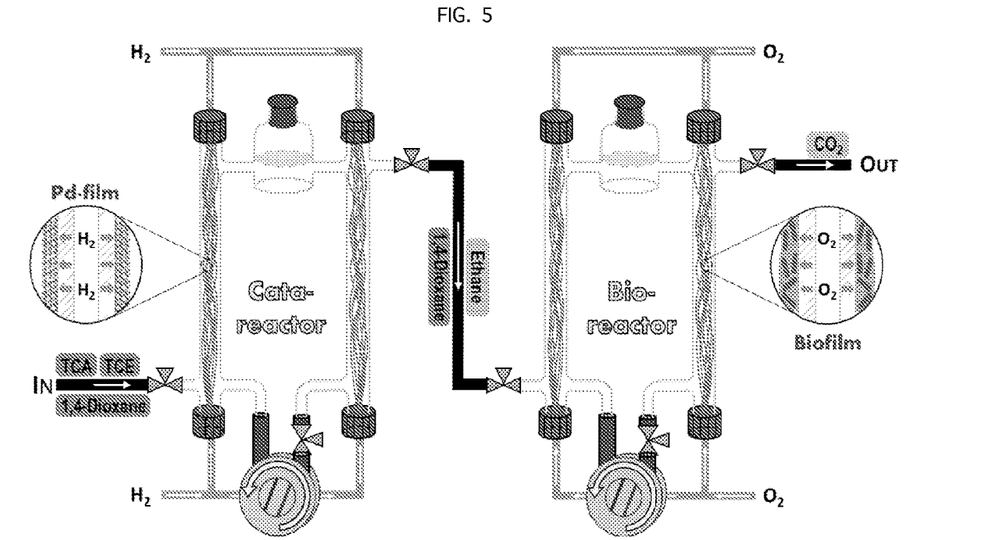
FIG. 5 depicts, in accordance with certain embodiments, a schematic of the synergistic bioreactor system comprising a reactor with a catalyst film (Cata-reactor) and a reactor with an ethane-oxidizing biofilm (Bio-reactor).

The two reactors were connected by linking the effluent tube of the Cata-reactor (also referred to herein as $H_2$-MCfR) to the influent tube of the Bio-reactor (also referred to herein as $O_2$-MBfR) (FIG. 5). The hydraulic retention time for both reactors were controlled at 15.0±1.0 hours. Operational parameter details of the bioreactor were listed in Table 1.

TABLE 1

| | | Cata-reactor parameters | | | |
|---|---|---|---|---|---|
| | | Value | Unit 1 | Value | Unit 2 |
| Catalyst synthesis | Palladium Conc. | 0.1 | mmol/L | 10.6 | mg/L |
| | $H_2$ pressure | 3 | psi | 1.2 | atm |
| | pH | 10 | | | |
| | Membranes type | Polypropylene membrane | | | |
| | Membranes area | 0.0362 | m² | 360 | cm² |
| | Total Pd | 0.007 | mmol | 0.74 | mg |
| | Coated Pd | 0.00686 | mmol | 0.73 | mg |
| | Pd surface loading | 0.19 | mmol/m | 20 | mg/m² |
| Operation | Flow rate | 0.07 | mL/min | 96 | mL/d |
| | $H_2$ pressure | 10 | psig | 1.7 | atm |
| | TCE influent | 100 | μmol/L | 13 | mg/L |
| | TCE loading | 0.27 | mmol/m²-d | 35 | mg/m²-d |

TABLE 1-continued

| Cata-reactor parameters | | | | | |
|---|---|---|---|---|---|
| | | Value | Unit 1 | Value | Unit 2 |
| | TCE Flux | 0.83 | mmol/m²-d | 110 | mg/m²-d |
| | TCA influent | 100 | μmol/L | 13 | mg/L |
| | TCA loading | 0.27 | mmol/m²-d | 36 | mg/m-d |
| | TCA Flux | 0.82 | mmol/m²-d | 110 | mg/m-d |

| Bio-reactor parameters | | | | | |
|---|---|---|---|---|---|
| | | Value | Unit 1 | Value | Unit 2 |
| Membrane | Membranes type | Composite membrane | | | |
| | Membranes area | 0.0143 | m² | 140 | cm² |
| Operation | Flow rate | 0.07 | mL/min | 96 | mL/d |
| | O₂ pressure | 10 | psig | 1.7 | atm |
| | Dioxane influent | 200 | μmol/L | 17.6 | mg/L |
| | Dioxane loading | 1.35 | mmol/m²-d | 119 | mg/m²-day |
| | Dioxane Flux | 1.33 | mmol/m²-d | 117 | mg/m²-day |

A basic medium was prepared in 5-L medium bottles, sparged with $C_2H_6$ (only for separated operation of Bio-reactor) or $N_2$ (for other operation conditions) for deoxygenation, and then transferred to 5-L Tedlar bags (CEL Scientific Corp., Santa Fe Springs, CA) in an anaerobic glove box. The components of the basic medium were 1 mM $KH_2PO_4$, 1 mM $K_2HPO_4$, 0.02 $CaCl_2 \cdot 2H_2O$, 0.018 mM $MgCl_2$, 0.2 mM $NH_4Cl$, 0.002 mM $MgSO_4 \cdot 7H_2O$, 0.002 mM $FeCl_2 \cdot 4H_2O$, and 4 mM $NaHCO_3$, plus 1 mL/L trace metal stock solution. Pure liquid TCA+TCE and/or concentrated 1,4-D solution were then injected into the basic medium through the sampling septa of Tedlar bags.

Figure 6:
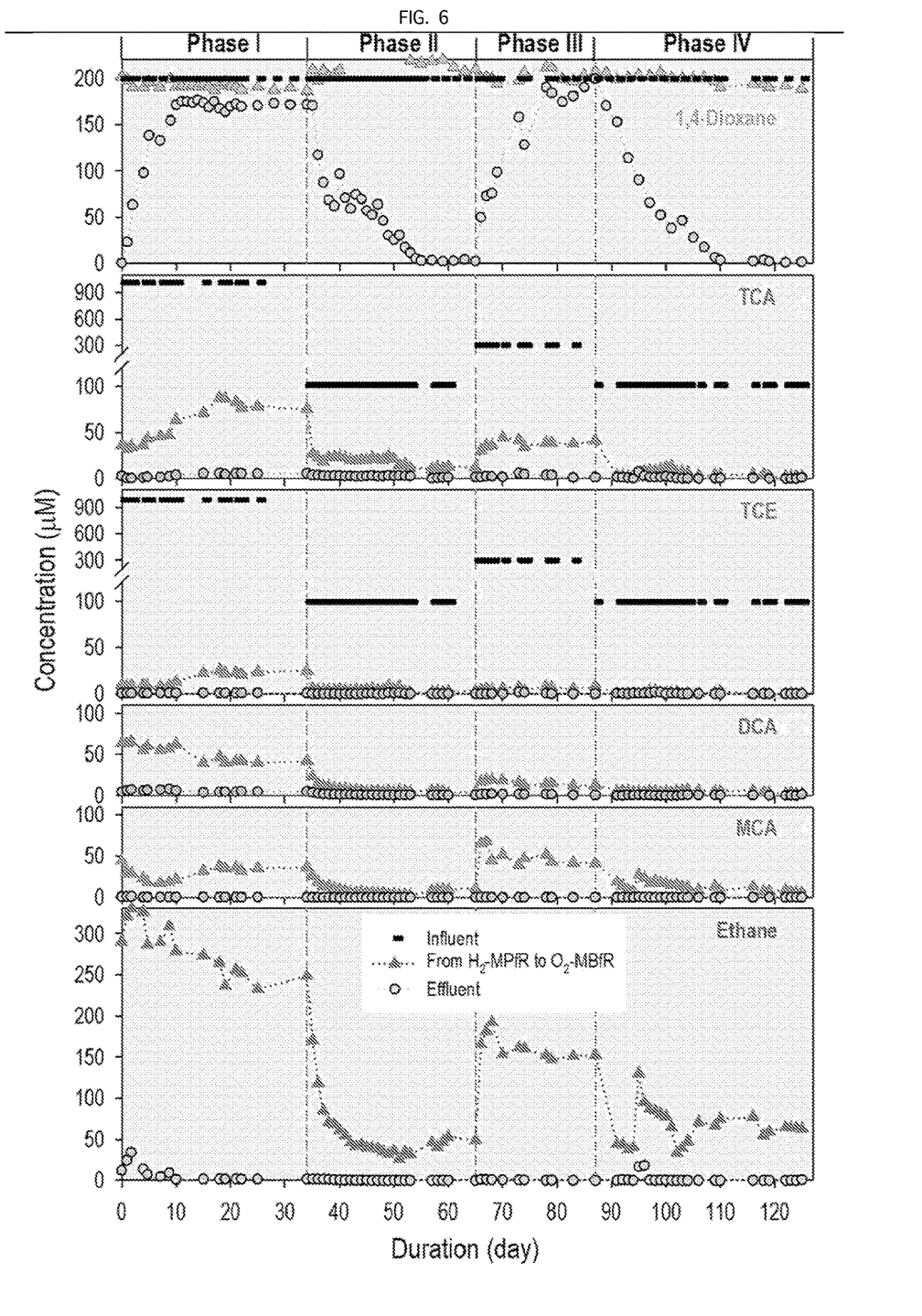
FIG. 6 depicts, in accordance with certain embodiments, substrate concentrations in the synergistic system. The dashed horizontal lines represent the influent concentration of 1,4-dioxane, TCA, and TCE. The solid triangles represent the substrate concentration from Cata-reactor to Bio-reactor, including 1,4-dioxane, TCA, TCE, DCA, MCA and ethane. The dots represent the corresponding effluent concentration of different substrates.

After combining two reactors into a synergistic platform, the reactors were fed with 1 mM TCA, 1 mM TCE, and 0.5 mM 1,4-D, with an HRT of 15 hours as stage 1. The effluent concentration of TCA and TCE from the Cata-reactor were gradually stable at 80 μM and 23 μM, along with intermediates 41 μM DCA and 35 μM MCA (FIG. 6). The 1,4-D effluent concentration of the Bio-reactor greatly increased from <10 μM to 420 μM, which may have been caused by chlorinated solvent inhibition to 1,4-D biodegradation and the concentration decrease of the primary substrate ethane. Most of the remaining chlorinated solvents were removed in the Bio-reactor, by co-oxidation.

Because the chlorinated solvents strongly inhibit 1,4-D biodegradation, the influent concentration of TCA and TCE was reduced to 100 μM and the concentration of 1,4-D to 200 μM in stage II. Then, the effluent chlorinated solvents concentration from the Cata-reactor were well controlled to relatively lower level. The effluent 1,4-D concentration gradually decreased from over 100 μM to <1 μM. The removal rate increase of 1,4-D reveal that the ethane produced from Cata-reactor was able to support the co-oxidation of 1,4-D. And the inhibition of chlorinated solvents could be minimized by pre-dechlorination in the Cata-reactor.

By increasing the influent concentration of TCA and TCE to 300 μM, the 1,4-D biodegradation was inhibited again by the remaining chlorinated solvents. The mixture of 39 μM TCA, 7.1 μM TCE, 13.4 μM DCA, and 44.6 μM MCA from Cata-reactor was high enough to significantly inhibit the 1,4-D removal. To test the stability of the synergistic platform, the influent concentration of TCA and TCE was reduced back to 100 μM. In an over one-month long-term operation of stage IV, stable simultaneous removal of TCA/TCE and 1,4-D was achieved, and all the substrates effluent concentration below the U.S. EPA MCLs.

Overall, the synergistic platform could use the Cata-reactor to reduce TCA/TCE concentration and produce ethane for subsequent co-oxidation of 1,4-D in the Bio-reactor. With proper surface loading control for TCA/TCE, the synergistic platform successfully achieved simultaneous removal of all three co-contaminants without extra organic carbon input and accumulation of toxic intermediates.

What is claimed:

1. A system for removing trichloroethane (TCA), trichloroethene (TCE), and 1,4-dioxane (1,4-D) contaminants from a fluid, comprising: a first reactor and a second reactor, wherein:
    the first reactor and the second reactor are in fluid connection with each other;
    the first reactor comprises:
        a catalyst film that reduces TCA and TCE, the catalyst film comprising precious metal nanoparticles with diameters of 5-40 nm;
        a first nonporous membrane comprising a gas-phase side and a liquid-phase side, wherein the catalyst film is deposited on the liquid-phase side of the first nonporous membrane; and
        a hydrogen ($H_2$) gas source, wherein the $H_2$ gas source delivers hydrogen to the gas-phase side of the first nonporous membrane and the precious metal nanoparticles and the $H_2$ gas catalyze the reduction of TCA and TCE; and
    the second reactor comprises:
        a biofilm that oxidizes 1,4-D, wherein the biofilm comprises *Methyloversatilis*;
        a second nonporous membrane comprising a gas-phase side and a liquid-phase side, wherein the biofilm is deposited on the liquid-phase of the second nonporous membrane; and
        an oxygen ($O_2$) gas source, wherein the $O_2$ gas source delivers oxygen to the gas-phase side of the second non-porous membrane.

2. The system of claim 1, wherein the catalyst film consists of precious metal nanoparticles with a mean diameter of less than 19 nm.

3. The system of claim 1, wherein the biofilm comprises microorganisms capable of degrading ethane and 1,4-D.

4. The system of claim 1, wherein the fluid flows from the first reactor to the second reactor.

5. The system of claim 1, wherein the fluid flows through the system at a hydraulic retention time (HRT) of no more than 24 hours.

6. The system of claim 1, wherein the precious metal is a platinum group metal or palladium.

7. The system of claim 1, wherein the catalyst film consists of palladium nanoparticles.

8. The system of claim 1, wherein the biofilm further comprises bacteria from:
    at least one family selected from the group consisting of Rhodocyclaceae, Pseudonocardiaceae, Brandyrhizobiaceae, and Chitinophagaceae, or
    at least one genus selected from the group consisting of: *Pseudonocardia* and *Bradyrhizobium*.

9. A method of removing trichloroethane (TCA), trichloroethene (TCE), and 1,4-dioxane (1,4-D) contaminants from a fluid, the method comprising:
    contacting a fluid comprising TCA and TCE with a catalyst film to produce a fluid comprising 1,4-D, wherein the catalyst film comprises precious metal nanoparticles with diameters of 5-40 nm; and contacting the fluid comprising 1,4-D with a biofilm to produce a fluid comprising $CO_2$ in the presence of oxygen ($O_2$) gas, wherein the biofilm comprises *Methyloversatilis*.

10. The method of claim 9, further comprising:

providing a nonporous membrane, wherein the nonporous membrane comprises a gas-phase side and a liquid-phase side;

contacting the liquid-phase side of the nonporous membrane with a catalyst-precursor medium, the catalyst-precursor medium comprising a precious metal salt and a solvent; and contacting the gas-phase side of the first nonporous membrane with hydrogen ($H_2$) gas at a sufficient partial pressure to convert at least 90% of the precious metal salt in the catalyst-precursor medium to elemental form, wherein the elemental form of the precious metal is in the form of a nanoparticles and is deposited on the liquid-phase side of the first nonporous membrane.

11. The method of claim 10, wherein the precious metal concentration in the catalyst-precursor medium is 0.01-100 mM.

12. The method of claim 10, wherein the pH of the catalyst-precursor medium is 6-8.

13. The method of claim 10, wherein the first nonporous membrane is in a reactor comprising the fluid comprising TCA and TCE and the catalyst film.

14. The method of claim 10, wherein the precious metal salt consists of palladium salts.

15. The method of claim 9, further comprising:

submerging a nonporous membrane within a microorganism-enrichment medium comprising dissolved ethane and/or 1,4-D;

contacting an inoculant with the nonporous membrane, wherein the inoculant comprises microorganisms capable of degrading ethane and 1,4-D; and pressurizing the gas-phase side of the nonporous membrane with the $O_2$ gas at a desired partial pressure.

16. The method of claim 15, wherein the nonporous membrane is in a reactor comprising the fluid comprising 1,4-D and the biofilm.

17. The method of claim 13, wherein the fluid comprising TCA and TCE flows through the reactor at a hydraulic retention time (HRT) of no more than 24 hours.

18. The method of claim 9, wherein the precious metal is a platinum group metal or palladium.

* * * * *